(12) United States Patent
Kubota et al.

(10) Patent No.: US 7,690,805 B2
(45) Date of Patent: Apr. 6, 2010

(54) LIGHTING DEVICE, AND LIQUID CRYSTAL DISPLAY DEVICE USING SAME

(75) Inventors: Shigeo Kubota, Kanagawa (JP); Toshitaka Kawashima, Kanagawa (JP); Junichi Osako, Tokyo (JP); Hiroyuki Okita, Hiroshima (JP)

(73) Assignee: Sony Corporation, Tokyo (JP)

( * ) Notice: Subject to any disclaimer, the term of this patent is extended or adjusted under 35 U.S.C. 154(b) by 400 days.

(21) Appl. No.: 11/569,147

(22) PCT Filed: May 13, 2005

(86) PCT No.: PCT/JP2005/008806

§ 371 (c)(1),
(2), (4) Date: Oct. 19, 2007

(87) PCT Pub. No.: WO2005/111496

PCT Pub. Date: Nov. 24, 2005

(65) Prior Publication Data

US 2008/0170178 A1   Jul. 17, 2008

(30) Foreign Application Priority Data

May 19, 2004   (JP)   ............................ 2004-149680

(51) Int. Cl.
*G09F 13/08*   (2006.01)
*G09F 13/14*   (2006.01)

(52) U.S. Cl. ...................... 362/97.3; 362/231; 362/241; 362/247; 362/249.02; 362/293; 257/82; 257/89; 257/98

(58) Field of Classification Search ................ 362/97.3, 362/231, 241, 247, 249.02, 293; 257/82, 257/89, 98
See application file for complete search history.

(56) References Cited

U.S. PATENT DOCUMENTS

| 6,814,458 B2 | 11/2004 | Kim et al. |
| 2004/0062040 A1 | 4/2004 | Blume et al. |

FOREIGN PATENT DOCUMENTS

| EP | 1418628 | 5/2004 |
| JP | 63-010103 | 1/1988 |
| JP | 7-191311 | 7/1995 |
| JP | 10-221692 | 8/1998 |
| WO | WO0147039 | 6/2001 |

OTHER PUBLICATIONS

European Search Report corresponding to European Serial No. 05739205.2 dated Jul. 2, 2009.
International Search Report dated Aug. 2, 2005.

*Primary Examiner*—Ismael Negron
(74) *Attorney, Agent, or Firm*—Sonnenschein Nath & Rosenthal LLP

(57) ABSTRACT

There is provided a lighting device that lights a liquid crystal panel, including a substrate (51) on which red, green and blue light separating plates (52R, 52G, 52B) are alternately disposed with a pitch of w in array. Red LEDs (53R) are disposed one at every other center between the green and blue light separating plates (52G, 52B), green LEDs 53G are disposed one at every other center between the blue and red light separating plates (52B, 52R), and blue LEDs (53B) are disposed one at every other center between the red and green light separating plates (52R, 52G).

15 Claims, 24 Drawing Sheets

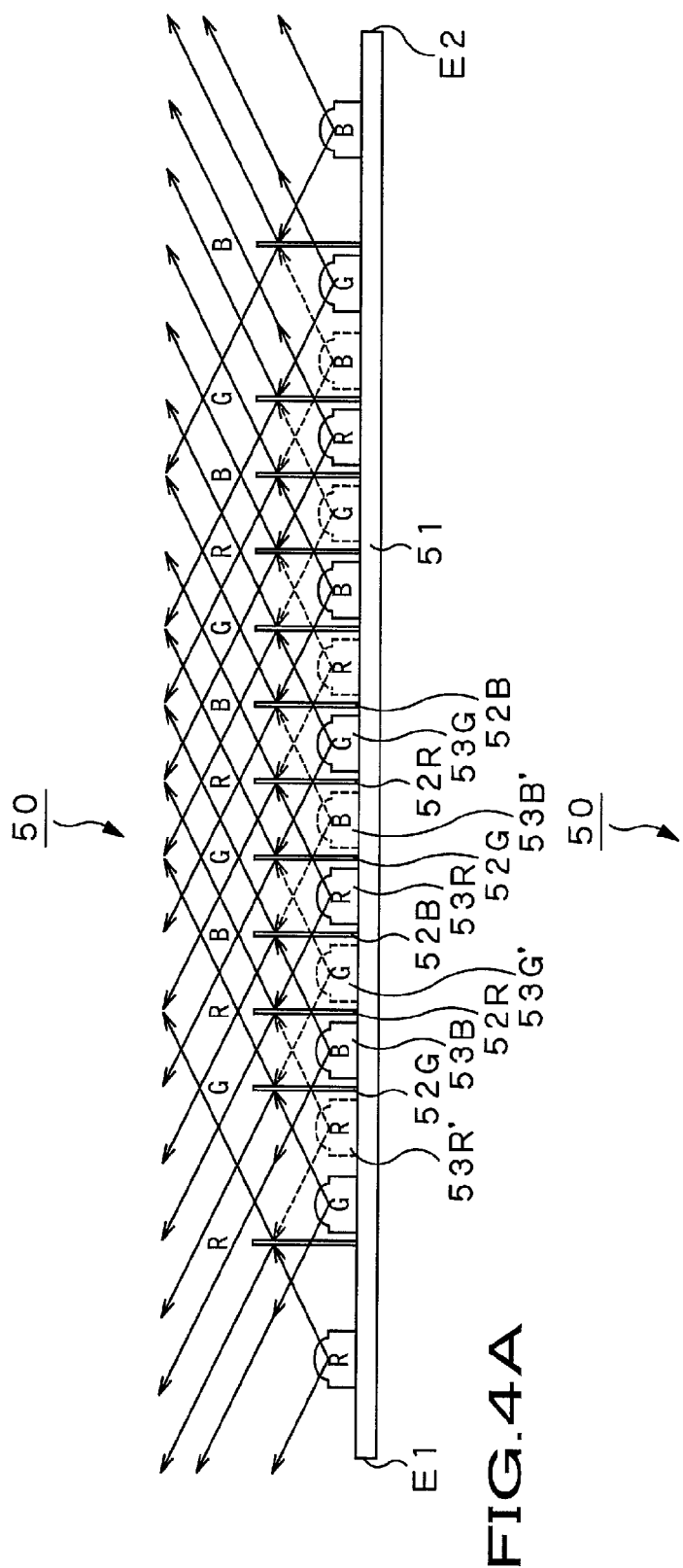
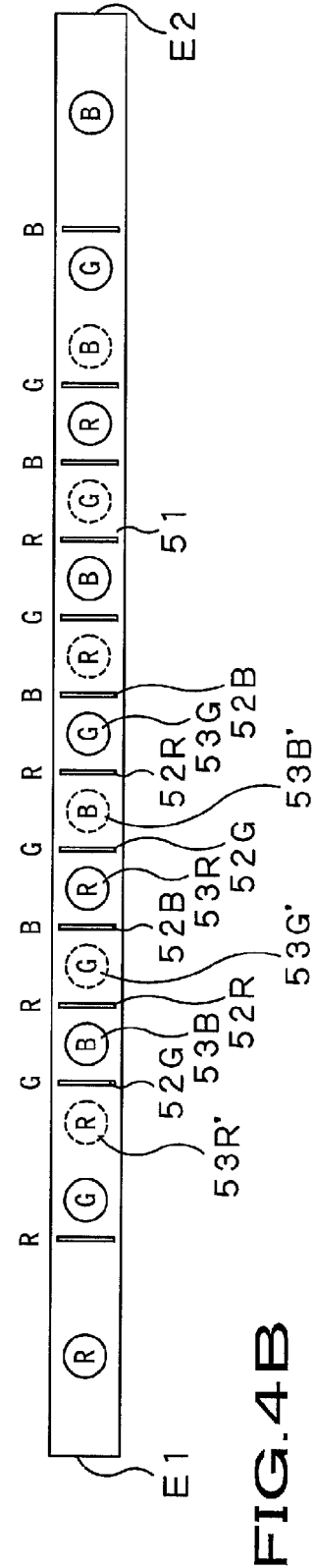
FIG.4A
FIG.4B

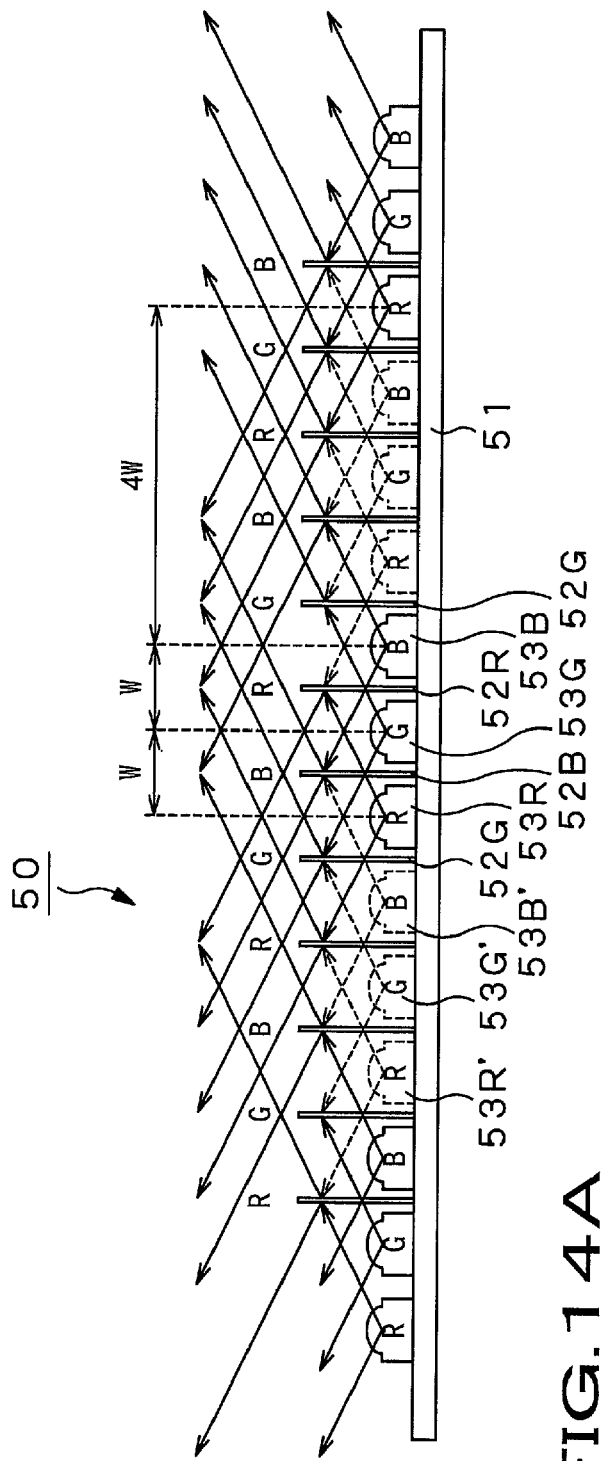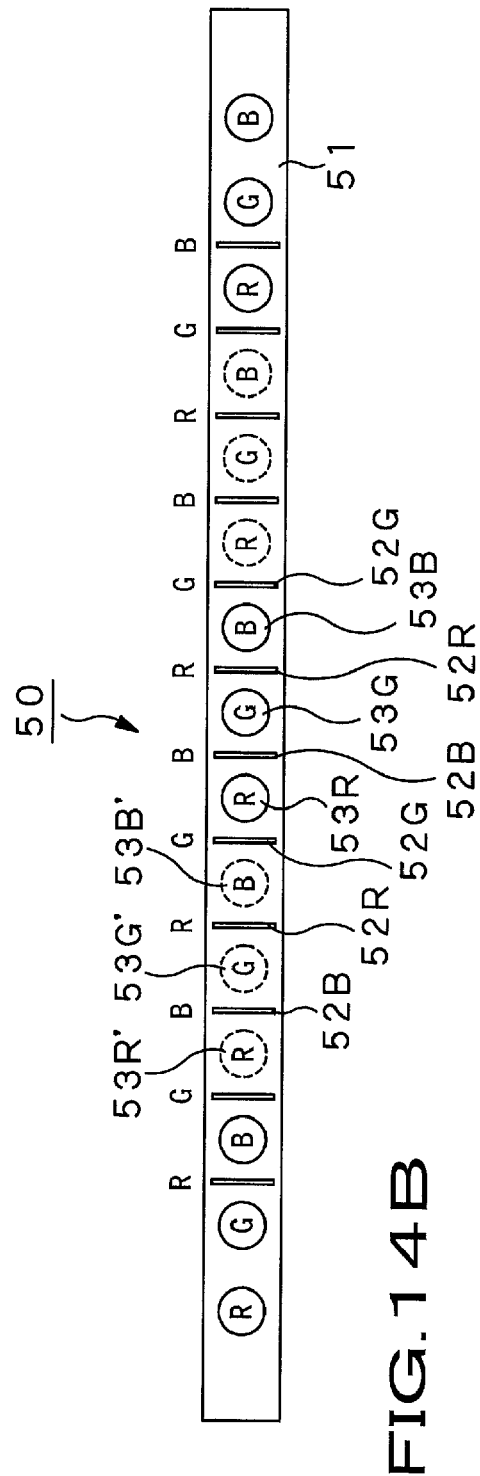
FIG.14A
FIG.14B

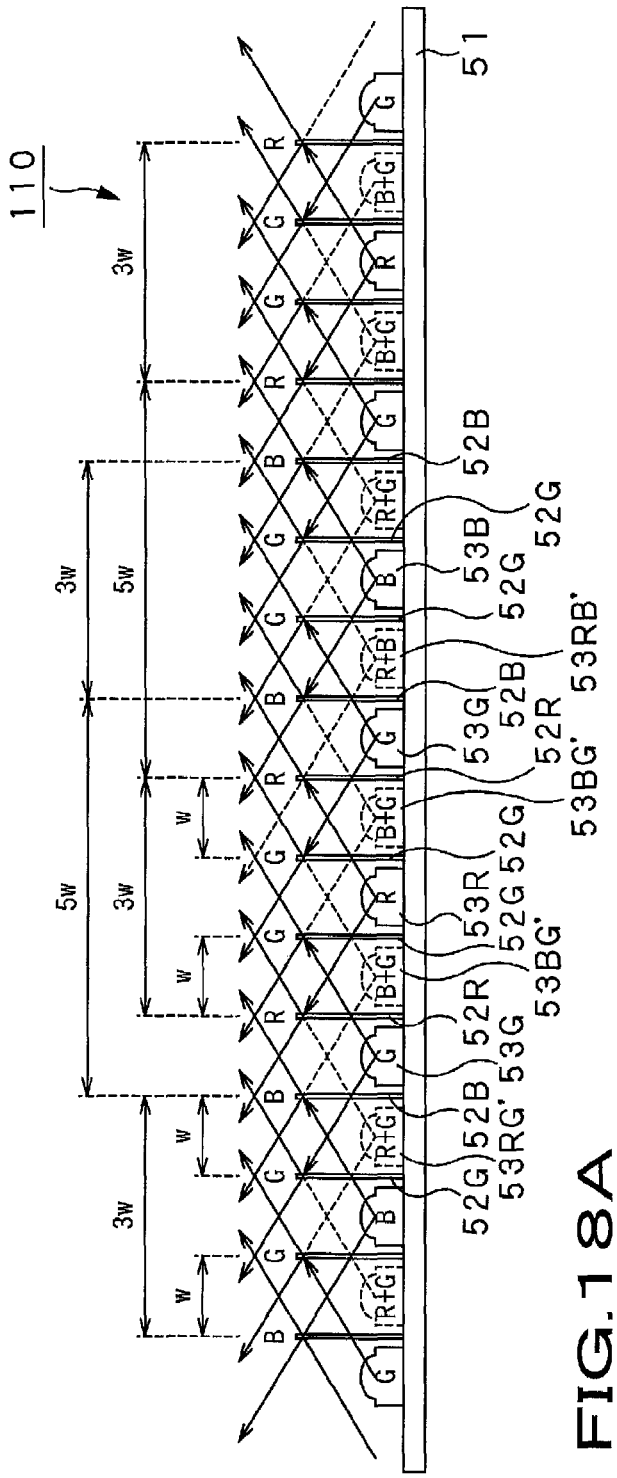
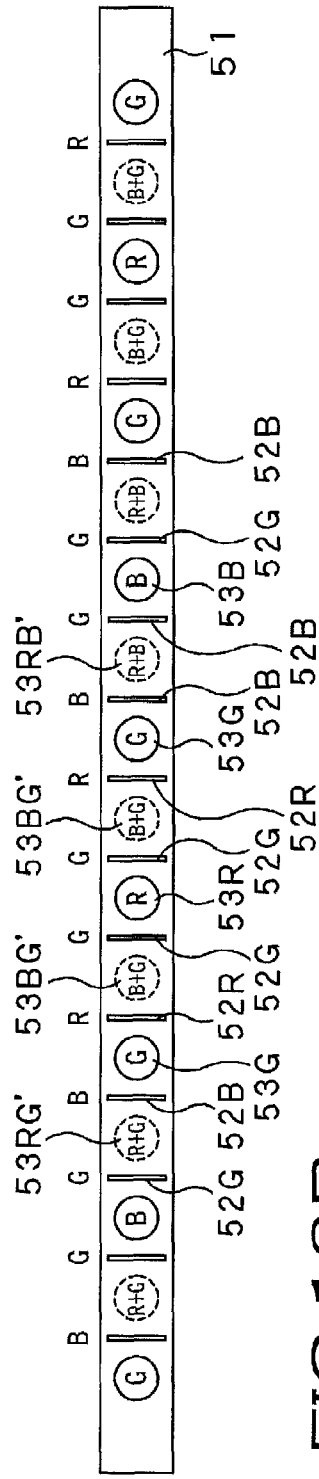
FIG.18A
FIG.18B

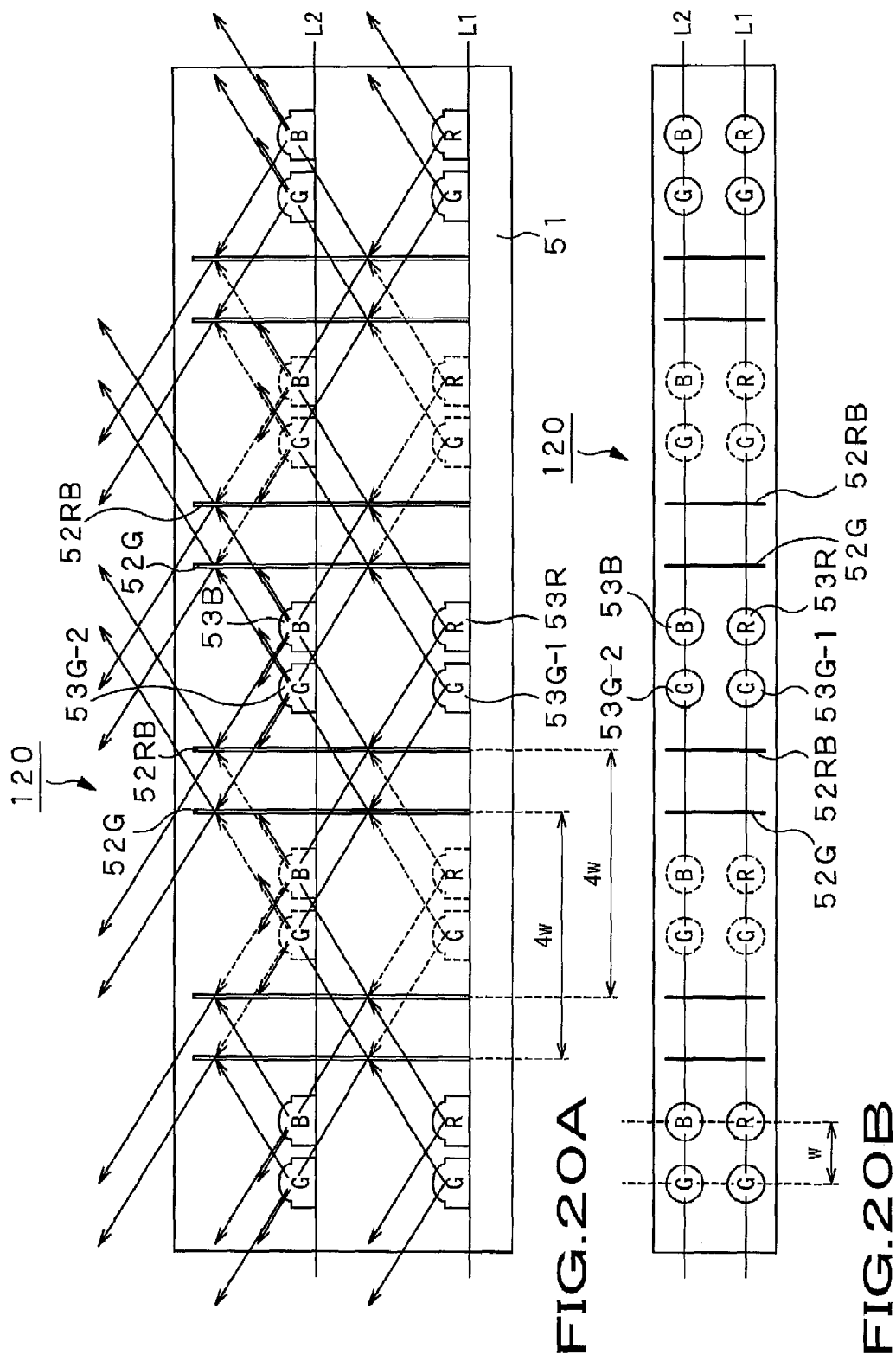

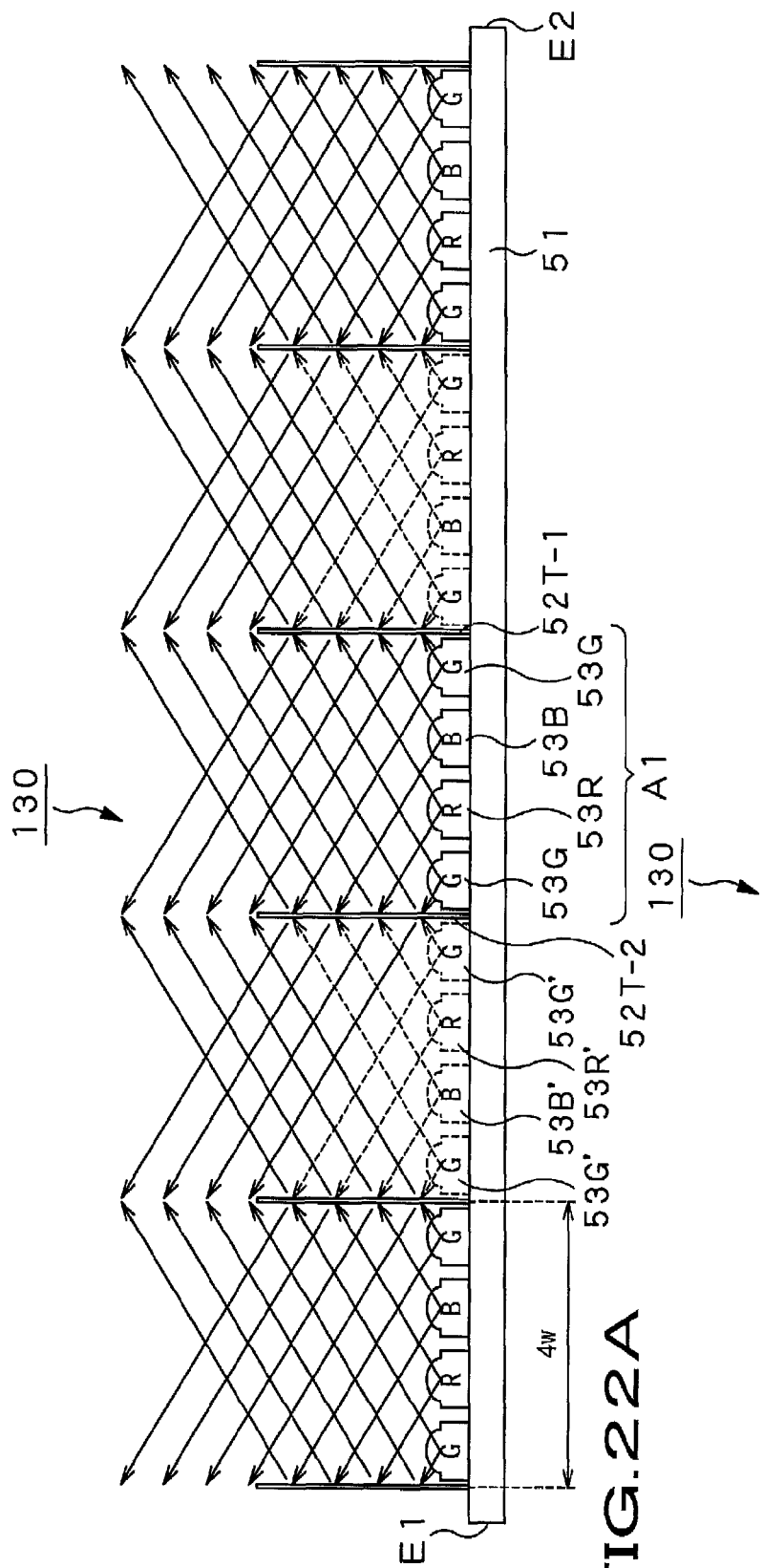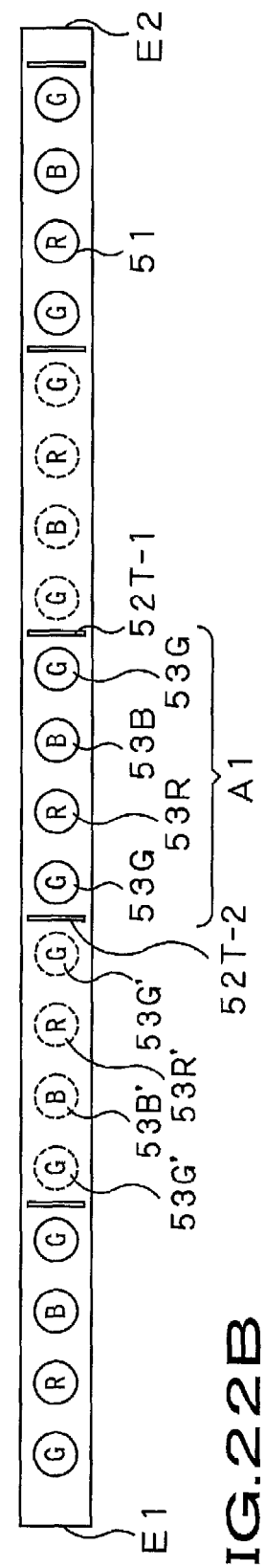

LIGHTING DEVICE, AND LIQUID CRYSTAL DISPLAY DEVICE USING SAME

TECHNICAL FIELD

The present invention generally relates to a lighting device and color liquid crystal display device, and more particularly, to a light emitting diode-based lighting device and a liquid crystal display device in which a liquid crystal panel is lighted by the lighting device using the light emitting diodes to improve the sharpness of an image being displayed on the liquid crystal panel.

This application claims the priority of the Japanese Patent Application No. 2004-149680 filed in the Japanese Patent Office on May 19, 2004, the entirety of which is incorporated by reference herein.

BACKGROUND ART

A thin, lightweight liquid crystal display is used widely as the display device for a TV receiver, personal computer, portable electronic device, etc. The liquid crystal display includes a liquid crystal panel to display an image and a backlight device which backlights the liquid crystal panel to improve sharpness of the image being displayed on the liquid crystal panel.

Many backlight devices use a cold cathode fluorescent lamp as a light source. Since the cold cathode fluorescent lamp uses mercury, however, if it is broken, for example, the mercury will possibly flow out and have an adverse influence on the environment. On this account, backlight devices using light emitting diodes (will be referred to as "LED" hereunder) have been proposed, one of which is disclosed in the Japanese Patent Laid Open No. 191311 of 1995, for example.

Also, the light emitting diode has a service life as long as about 50,000 hours. Therefore, use of light emitting diodes permits to reduce the adverse influence on the environment and implement a long-life backlight device.

However, LED is small in size. For example, its bottom has a circular shape whose diameter is about 9.6 mm and a height of about 6.09 mm, so that the light emitted from LED can cover only a limited range. Because of the narrow range of lighting, in case an LED-based backlight device is used to backlight a large-size liquid crystal display for a TV set, for example, it should include a plurality of LEDs disposed in array or plane. Many LEDs are necessary for this purpose.

However, use of many LEDs in the backlight device will add to the manufacturing cost of the backlight device and hence a large-size liquid crystal display including the LED-based backlight device will be expensive.

Also, the light emitted from LED varies in luminance from one LED to another. Therefore, the larger the number of LEDs used in a backlight device, the larger the variation in luminance and color of the light backlighting the liquid crystal panel will be. Any variation in luminance and color of the light backlighting the liquid crystal panel or the like will degrade color quality of an image being displayed on the liquid crystal panel.

DISCLOSURE OF THE INVENTION

It is therefore desirable to overcome the above-mentioned drawbacks of the related art by providing a lighting device using light emitting diodes as a light source, capable of efficient utilization of light emitted from the light emitting diodes and lessening variation in luminance and color of the light emitted from the light emitting diodes, and a color liquid crystal display using the lighting device capable of well reproducing the colors of an image being displayed on a color liquid crystal panel by lighting the liquid crystal panel by the lighting device According to an embodiment of the present invention, there is provided a lighting device including:

light emitting diodes (LED) each having a high directivity in a direction skewed from the optical axis thereof; and light separating means for reflecting a part of light emitted from the light emitting diodes while transmitting a part of the light.

The light emitting diode is disposed at a predetermined distance from the light separating means; and the light separating means transmits a part of the light emitted from the light emitting diode while reflecting a part of the light to form, in a position symmetrical with the light emitting diode with respect to the light separating means, a virtual image of the light emitting diode which is an apparent source of the light having been reflected by the light separating means.

Also, according to another embodiment of the present invention, there is provided a lighting device including:

a plurality of light emitting diodes (LED) each having a high directivity in a direction skewed from the optical axis thereof; and a plurality of light separating means for reflecting a part of light emitted from the light emitting diode while transmitting a part of the light.

The light separating means are disposed with a predetermined pitch in array, and the light emitting diodes are disposed one in every other area between the light separating means.

The light separating means transmits a part of the light emitted from the light emitting diode while reflecting a part of the light to form, in an area between the light separating means and where no light emitting diode is provided, a virtual image of the light emitting diode which is an apparent source of the light having been reflected by the light separating means.

Also, according to another embodiment of the present invention, there is provided a lighting device including:

a plurality of red light emitting diodes (LED) each having a high directivity in a direction skewed from the optical axis thereof and emitting red light;

a plurality of green light emitting diodes each having a high directivity in a direction skewed from the optical axis thereof and emitting green light;

a plurality of blue light emitting diodes each having a high directivity in a direction skewed from the optical axis thereof and emitting blue light;

red light separating means for transmitting a part of incident red light while reflecting a part of the light and transmitting incident green light and blue light;

green light separating means for transmitting a part of incident green light while reflecting a part of the light and transmitting incident blue light and red light; and blue light separating means for transmitting a part of incident blue light while reflecting a part of the light and transmitting incident red light and green light.

The red, green and blue light separating means are disposed alternately with a pitch $\underline{w}$ ($w>0_o$);

the red light emitting diodes are disposed at every other center between the adjacent green and blue light separating means;

the green light emitting diodes are disposed at every other center between the adjacent blue and red light separating means;

the blue light emitting diodes are disposed at every other center between the adjacent red and green light separating light separating means;

the red light separating means transmits a part of light from the red light emitting diode disposed in a position 1.5 w therefrom while reflecting a part of the light;

the green light separating means transmits a part of light from the green light emitting diode disposed in a position 1.5 w therefrom while reflecting a part of the light;

the blue light separating means transmits a part of light from the blue light emitting diode disposed in a position 1.5 w therefrom while reflecting a part of the light;

two red light separating means disposed in positions 3 w apart from each other and having no red light emitting diode disposed at the center between them form, between the green and blue light separating means disposed between the two red light separating means, a virtual image of a red light emitting diode which is an apparent source of the red light having been reflected by the two red light separating means;

two green light separating means disposed in positions 3 w apart from each other and having no green light emitting diode disposed at the center between them form, between the blue and red light separating means disposed between the two green light separating means, a virtual image of a green light emitting diode which is an apparent source of the green light having been reflected by the two green light separating means; and two blue light separating means disposed in positions 3 w apart from each other and having no blue light emitting diode disposed at the center between them form, between the red and green light separating means disposed between the two blue light separating means, a virtual image of a blue light emitting diode which is an apparent source of the blue light having been reflected by the two blue light separating means.

Also, according to another embodiment of the present invention, there is provided a lighting device including:

red light emitting diodes (LED) each having a high directivity in a direction skewed from the optical axis thereof and emitting red light;

blue light emitting diodes each having a high directivity in a direction skewed from the optical axis thereof and emitting blue light;

green light emitting diodes each having a high directivity in a direction skewed from the optical axis thereof and emitting green light;

red light separating means for transmitting a part of incident red light while reflecting a part of the light and transmitting incident green light and blue light;

green light separating means for transmitting a part of incident green light while reflecting a part of the light and transmitting incident blue light and red light; and blue light separating means for transmitting a part of incident blue light while reflecting a part of the light and transmitting incident red light and green light.

The red light separating means are disposed with pitches of 3 w and 5 w repeated alternately;

the blue light separating means are disposed in positions 4 w apart from the red light separating means in a predetermined direction;

the green light separating means are disposed one in each position $\underline{w}$ apart from two red light transmitting means in an area between two red light separating means adjacent to each other with a pitch of 3 w and one in each position $\underline{w}$ apart from two blue light transmitting means in an area between two blue light transmitting means disposed adjacent to each other with a pitch of 3 w;

the red light emitting diode is disposed at the center between two green light separating means disposed in an area between two red light separating means disposed with a pitch of 3 w;

the blue light emitting diode is disposed at the center between two green light separating means disposed in an area between two blue light separating means disposed with a pitch of 3 w;

the green light emitting diode is disposed at the center between the red and blue light separating means;

the red light separating means transmitting a part of light emitted from the red light emitting diode disposed in a position 1.5 w while reflecting a part of the light;

the green light separating means transmitting a part of light emitted from the green light emitting diode disposed in a position 1.5 w while reflecting a part of the light;

the blue light separating means transmitting a part of light emitted from the blue light emitting diode disposed in a position 1.5 w while reflecting a part of the light;

the red light separating means and the green light separating means disposed in a position 3 w apart from the red light separating means form, between the green and blue light separating means disposed in an area between the red and green light separating means, virtual images of the red and green light emitting diodes, respectively, which are an apparent source of the green light having been reflected by the green light separating means and an apparent source of the red light having been reflected by the red light separating means, respectively; and the blue light separating means and the green light separating means disposed in a position 3 w apart from the blue light separating means form, between the green and red light separating means disposed in an area between the blue and green light separating means, virtual images of the red and green light emitting diodes, respectively, which are an apparent source of the green light having been reflected by the green light separating means and an apparent source of the blue light having been reflected by the blue light separating means, respectively.

Also, according to another embodiment of the present invention, there is provided a lighting device including:

a plurality of red light emitting diodes (LED) each having a high directivity in a direction skewed from the optical axis thereof and emitting red light;

a plurality of green light emitting diodes each having a high directivity in a direction skewed from the optical axis thereof and emitting green light;

a plurality of blue light emitting diode each having a high directivity in a direction skewed from the optical axis thereof and emitting blue light;

green light separating means for transmitting a part of incident green light while reflecting a part of the red light and transmitting incident blue light and red light; and red/blue light separating means for transmitting a part of incident red and blue light while reflecting a part of the red and blue light and transmitting incident green light.

The green light separating means are disposed with a pitch of 4 w;

the red/blue light separating means is disposed in a position $\underline{w}$ apart from the green light separating means in a predetermined direction;

the green light emitting diodes are disposed two at every other center between two adjacent green light separating means;

the red light emitting diodes are disposed one at every other center between two adjacent red/blue light separating means;

the blue light emitting diodes are disposed one at every other center between two adjacent red/blue light separating means;

the green light separating means transmits a part of light emitted from the green light emitting diode disposed in a position 2 w apart therefrom while reflecting a part of the light;

the red/blue light separating means transmits a part of light emitted from the red and blue light emitting diodes disposed in a position 2 w apart therefrom while reflecting a part of the light;

the green light separating means disposed in positions 4 w apart from each other and having no green light emitting diode disposed between them form, between the two green light separating means, a virtual image of the green light emitting diode which is an apparent source of the green light having been reflected by two green light separating means; and the red/blue light separating means disposed in positions 4 w apart from each other and having no red and blue light emitting diodes disposed between them form, between the two red/blue light separating means, a virtual image of the red light emitting diode which is an apparent source of the red light having been reflected by two red/blue light separating means and a virtual image of the blue light emitting diode which is an apparent source of the blue light having been reflected by two red/blue light separating means.

Also, according to another embodiment of the present invention, there is provided a lighting device including:

red light emitting diodes (LED) each having a high directivity in a direction skewed from the optical axis thereof and emitting red light;

green light emitting diodes each having a high directivity in a direction skewed from the optical axis thereof and emitting green light;

blue light emitting diodes each having a high directivity in a direction skewed from the optical axis thereof and emitting blue light; and primary-colors light separating means for reflecting a part of incident red, green and blue light while transmitting a part of the light.

The primary-colors light separating means are disposed with a pitch of 4 w in array;

the red, green and blue light emitting diodes are disposed in every other area between the primary-colors light separating means and/or in every other area at either end of the primary-colors light separating means disposed in array;

the primary-colors light separating means transmits a part of light emitted from the red, green and blue light emitting diodes disposed in an area adjacent thereto while reflecting a part of the light; and two primary-colors light separating means adjacent to each other and having no red, green and blue light emitting diodes disposed between them form, in an area between two primary-colors light separating means, a virtual image of the red light emitting diode which is an apparent source of the red light having been reflected by the two primary-colors light separating means, a virtual image of the green light emitting diode which is an apparent source of the green light having been reflected by the two primary-colors light separating means, and a virtual image of the blue light emitting diode which is an apparent source of the blue light having been reflected by the two primary-colors light separating means.

Also, according to another embodiment of the present invention, there is provided a lighting device including:

red light emitting diodes (LED) each having a high directivity in a direction skewed from the optical axis thereof and emitting red light;

green light emitting diodes each having a high directivity in a direction skewed from the optical axis thereof and emitting green light;

blue light emitting diodes each having a high directivity in a direction skewed from the optical axis thereof and emitting blue light; and primary-colors light separating means for reflecting a part of incident red, green and blue light while transmitting a part of the light, the primary-colors light separating means being disposed with a pitch of $\underline{w}$ in array;

the red, green and blue light emitting diodes being disposed opposite to the primary-colors light separating means in a predetermined order in every other area between the primary-colors light separating means and/or in every other area at either end of the primary-colors light separating means disposed in array;

the primary-colors light separating means transmitting a part of light emitted from the red, green and blue light emitting diodes disposed in an area adjacent thereto while reflecting a part of the light; and two primary-colors light separating means adjacent to each other and having no red, green and blue light emitting diodes disposed between them forming, in an area between two primary-colors light separating means, a virtual image of the red light emitting diode which is an apparent source of the red light having been reflected by the two primary-colors light separating means, a virtual image of the green light emitting diode which is an apparent source of the green light having been reflected by the two primary-colors light separating means, and a virtual image of the blue light emitting diode which is an apparent source of the blue light having been reflected by the two primary-colors light separating means.

Also, according to another embodiment of the present invention, there is provided a liquid crystal display device including a transmission-type liquid crystal panel and a backlight device to light the liquid crystal panel from one main side of the latter, the backlight device including:

light emitting diodes (LED) each having a high directivity in a direction skewed from the optical axis thereof; and light separating means for reflecting a part of light emitted from the light emitting diodes while transmitting a part of the light, the light emitting diode being disposed at a predetermined distance from the light separating means; and the light separating means transmitting a part of the light emitted from the light emitting diode while reflecting a part of the light to form, in a position symmetrical with the light emitting diode with respect to the light separating means, a virtual image of the light emitting diode which is an apparent source of the light having been reflected by the light separating means.

Also, according to another embodiment of the present invention, there is provided a liquid crystal display device including a transmission-type liquid crystal panel and a backlight device to light the liquid crystal panel from one main side of the latter, the backlight device including:

a plurality of light emitting diodes (LED) each having a high directivity in a direction skewed from the optical axis thereof; and a plurality of light separating means for reflecting a part of light emitted from the light emitting diode while transmitting a part of the light, the light separating means being disposed with a predetermined pitch in array;

the light emitting diodes are disposed one in every other area between the light separating means; and the light separating means transmitting a part of the light emitted from the light emitting diode while reflecting a part of the light to form, in an area between the light separating means and where no light emitting diode is provided, a virtual image of the light emitting diode which is an apparent source of the light having been reflected by the light separating means.

Also, according to another embodiment of the present invention, there is provided a liquid crystal display device including a transmission-type liquid crystal panel and a backlight device to light the liquid crystal panel from one main side of the latter, the backlight device including:

a plurality of red light emitting diodes (LED) each having a high directivity in a direction skewed from the optical axis thereof and emitting red light;

a plurality of green light emitting diodes each having a high directivity in a direction skewed from the optical axis thereof and emitting green light;

a plurality of blue light emitting diodes each having a high directivity in a direction skewed from the optical axis thereof and emitting blue light;

red light separating means for transmitting a part of incident red light while reflecting a part of the light and transmitting incident green light and blue light;

green light separating means for transmitting a part of incident green light while reflecting a part of the light and transmitting incident blue light and red light; and blue light separating means for transmitting a part of incident blue light while reflecting a part of the light and transmitting incident red light and green light, the red, green and blue light separating means being disposed alternately with a pitch $w$ ($w > 0_o$);

the red light emitting diodes being disposed at every other center between the adjacent green and blue light separating means;

the green light emitting diodes being disposed at every other center between the adjacent blue and red light separating means;

the blue light emitting diodes being disposed at every other center between the adjacent red and green light separating light separating means;

the red light separating means transmitting a part of light from the red light emitting diode disposed in a position 1.5 w therefrom while reflecting a part of the light;

the green light separating means transmitting a part of light from the green light emitting diode disposed in a position 1.5 w therefrom while reflecting a part of the light;

the blue light separating means transmitting a part of light from the blue light emitting diode disposed in a position 1.5 w therefrom while reflecting a part of the light;

two red light separating means disposed in positions 3 w apart from each other and having no red light emitting diode disposed at the center between them forming, between the green and blue light separating means disposed between the two red light separating means, a virtual image of a red light emitting diode which is an apparent source of the red light having been reflected by the two red light separating means;

two green light separating means disposed in positions 3 w apart from each other and having no green light emitting diode disposed at the center between them forming, between the blue and red light separating means disposed between the two green light separating means, a virtual image of a green light emitting diode which is an apparent source of the green light having been reflected by the two green light separating means; and two blue light separating means disposed in positions 3 w apart from each other and having no blue light emitting diode disposed at the center between them forming, between the red and green light separating means disposed between the two blue light separating means, a virtual image of a blue light emitting diode which is an apparent source of the blue light having been reflected by the two blue light separating means.

Also, according to another embodiment of the present invention, there is provided a liquid crystal display device including a transmission-type liquid crystal panel and a backlight device to light the liquid crystal panel from one main side of the latter, the backlight device including:

red light emitting diodes (LED) each having a high directivity in a direction skewed from the optical axis thereof and emitting red light;

blue light emitting diodes each having a high directivity in a direction skewed from the optical axis thereof and emitting blue light;

green light emitting diodes each having a high directivity in a direction skewed from the optical axis thereof and emitting green light;

red light separating means for transmitting a part of incident red light while reflecting a part of the light and transmitting incident green light and blue light;

green light separating means for transmitting a part of incident green light while reflecting a part of the light and transmitting incident blue light and red light; and blue light separating means for transmitting a part of incident blue light while reflecting a part of the light and transmitting incident red light and green light, the red light separating means being disposed with pitches of 3 w and 5 w repeated alternately;

the blue light separating means being disposed in positions 4 w apart from the red light separating means in a predetermined direction;

the green light separating means being disposed one in each position $w$ apart from two red light transmitting means in an area between two red light separating means adjacent to each other with a pitch of 3 w and one in each position $w$ apart from two blue light transmitting means in an area between two blue light transmitting means disposed adjacent to each other with a pitch of 3 w;

the red light emitting diode being disposed at the center between two green light separating means disposed in an area between two red light separating means disposed with a pitch of 3 w;

the blue light emitting diode being disposed at the center between two green light separating means disposed in an area between two blue light separating means disposed with a pitch of 3 w;

the green light emitting diode being disposed at the center between the red and blue light separating means;

the red light separating means transmitting a part of light emitted from the red light emitting diode disposed in a position 1.5 w while reflecting a part of the light;

the green light separating means transmitting a part of light emitted from the green light emitting diode disposed in a position 1.5 w while reflecting a part of the light;

the blue light separating means transmitting a part of light emitted from the blue light emitting diode disposed in a position 1.5 w while reflecting a part of the light;

the red light separating means and the green light separating means disposed in a position 3 w apart from the red light separating means forming, between the green and blue light separating means disposed in an area between the red and green light separating means, virtual images of the red and green light emitting diodes, respectively, which are an apparent source of the green light having been reflected by the green light separating means and an apparent source of the red light having been reflected by the red light separating means, respectively; and the blue light separating means and the green light separating means disposed in a position 3 w apart from the blue light separating means forming, between the green and red light separating means disposed in an area between the blue and green light separating means, virtual images of the red and green light emitting diodes, respectively, which are an apparent source of the green light having been reflected by the green light separating means and an apparent source of the blue light having been reflected by the blue light separating means, respectively.

Also, according to another embodiment of the present invention, there is provided a liquid crystal display device including a transmission-type liquid crystal panel and a backlight device to light the liquid crystal panel from one main side of the latter, the backlight device including:

a plurality of red light emitting diodes (LED) each having a high directivity in a direction skewed from the optical axis thereof and emitting red light;

a plurality of green light emitting diodes each having a high directivity in a direction skewed from the optical axis thereof and emitting green light;

a plurality of blue light emitting diode each having a high directivity in a direction skewed from the optical axis thereof and emitting blue light;

green light separating means for transmitting a part of incident green light while reflecting a part of the red light and transmitting incident blue light and red light; and red/blue light separating means for transmitting a part of incident red and blue light while reflecting a part of the red and blue light and transmitting incident green light, the green light separating means being disposed with a pitch of 4 w;

the red/blue light separating means being disposed in a position $\underline{w}$ apart from the green light separating means in a predetermined direction;

the green light emitting diodes being disposed two at every other center between two adjacent green light separating means;

the red light emitting diodes being disposed one at every other center between two adjacent red/blue light separating means;

the blue light emitting diodes being disposed one at every other center between two adjacent red/blue light separating means;

the green light separating means transmitting a part of light emitted from the green light emitting diode disposed in a position 2 w apart therefrom while reflecting a part of the light;

the red/blue light separating means transmitting a part of light emitted from the red and blue light emitting diodes disposed in a position 2 w apart therefrom while reflecting a part of the light;

the green light separating means disposed in positions 4 w apart from each other and having no green light emitting diode disposed between them forming, between the two green light separating means, a virtual image of the green light emitting diode which is an apparent source of the green light having been reflected by two green light separating means; and the red light separating means disposed in positions 4 w apart from each other and having no red and blue light emitting diodes disposed between them forming, between the two red/blue light separating means, a virtual image of the red light emitting diode which is an apparent source of the red light having been reflected by two red/blue light separating means and a virtual image of the blue light emitting diode which is an apparent source of the blue light having been reflected by two red/blue light separating means.

Also, according to another embodiment of the present invention, there is provided a liquid crystal display device including a transmission-type liquid crystal panel and a backlight device to light the liquid crystal panel from one main side of the latter, the backlight device including:

red light emitting diodes (LED) each having a high directivity in a direction skewed from the optical axis thereof and emitting red light;

green light emitting diodes each having a high directivity in a direction skewed from the optical axis thereof and emitting green light;

blue light emitting diodes each having a high directivity in a direction skewed from the optical axis thereof and emitting blue light; and primary-colors light separating means for reflecting a part of incident red, green and blue light while transmitting a part of the light, the primary-colors light separating means being disposed with a pitch of 4 w in array;

the red, green and blue light emitting diodes are disposed in every other area between the primary-colors light separating means and/or in every other area at either end of the primary-colors light separating means disposed in array;

the primary-colors light separating means transmitting a part of light emitted from the red, green and blue light emitting diodes disposed in an area adjacent thereto while reflecting a part of the light;

two primary-colors light separating means adjacent to each other and having no red, green and blue light emitting diodes disposed between them forming, in an area between two primary-colors light separating means, a virtual image of the red light emitting diode which is an apparent source of the red light having been reflected by the two primary-colors light separating means, a virtual image of the green light emitting diode which is an apparent source of the green light having been reflected by the two primary-colors light separating means, and a virtual image of the blue light emitting diode which is an apparent source of the blue light having been reflected by the two primary-colors light separating means.

Also, according to another embodiment of the present invention, there is provided a liquid crystal display device including a transmission-type liquid crystal panel and a backlight device to light the liquid crystal panel from one main side of the latter, the backlight device including:

red light emitting diodes (LED) each having a high directivity in a direction skewed from the optical axis thereof and emitting red light;

green light emitting diodes each having a high directivity in a direction skewed from the optical axis thereof and emitting green light;

blue light emitting diodes each having a high directivity in a direction skewed from the optical axis thereof and emitting blue light; and primary-colors light separating means for reflecting a part of incident red, green and blue light while transmitting a part of the light, the primary-colors light separating means being disposed with a pitch of $\underline{w}$ in array;

the red, green and blue light emitting diodes being disposed opposite to the primary-colors light separating means in a predetermined order in every other area between the primary-colors light separating means and/or in every other area at either end of the primary-colors light separating means disposed in array;

the primary-colors light separating means transmitting a part of light emitted from the red, green and blue light emitting diodes disposed in an area adjacent thereto while reflecting a part of the light; and two primary-colors light separating means adjacent to each other and having no red, green and blue light emitting diodes disposed between them forming, in an area between two primary-colors light separating means, a virtual image of the red light emitting diode which is an apparent source of the red light having been reflected by the two primary-colors light separating means, a virtual image of the green light emitting diode which is an apparent source of the green light having been reflected by the two primary-colors light separating means, and a virtual image of the blue light emitting diode which is an apparent source of the blue light having been reflected by the two primary-colors light separating means.

In the above embodiments of the present invention, the light separating means transmits a part of light emitted from the light emitting diode while reflecting a part of the light to form, in a position opposite to the light emitting diode with reference to the light separating means, a virtual image of the light emitting diode which is an apparent source of the light having been reflected by the light separating means.

Since the virtual image of the light emitting diode is formed in the position opposite to the light emitting diode with reference to the light separating means, it is possible in the lighting device according to the embodiment of the present invention to increase the number of apparent light emitting diodes used in the lighting device. Because of the increased number of apparent the light emitting diodes, the lighting device as the embodiment of the present invention can emit light which is uniform in luminance distribution and light a to-be-lighted object by a decreased number of light emitting diodes. Also, the liquid crystal display device as the embodiment of the present invention can have the liquid crystal panel thereof lighted by the lighting device capable of emitting light which is uniform in luminance distribution by a decreased number of light emitting diodes.

Therefore, the number of light emitting diodes used in the lighting device and liquid crystal display device as the embodiments of the present invention can be formed smaller than that in case no light separating means are used. Since the number of light emitting diodes can thus be decreased, the lighting device and liquid crystal display device as the embodiments of the present invention can be produced with less costs, Also, the lighting device and liquid crystal display device can be operated with a reduced power consumption.

The foregoing and other features, aspects and advantages of the present invention will be come apparent from the following detailed description of embodiments of the present invention when taken in conjunction with the accompanying drawings.

BRIEF DESCRIPTION OF THE DRAWINGS

FIG. 4A is a side elevation of a light source included in the backlight device, and FIG. 4B is a plan view of the light source.

FIG. 14A is a side elevation showing another example disposition of LEDs included in the light source, and FIG. 14B is a plan view of LEDs.

FIG. 18A is a side elevation of a light source used in a second embodiment of the present invention, and FIG. 18B is a plan view of the light source.

FIG. 20A is a side elevation of a light source used in a third embodiment of the present invention, and FIG. 20B is a plan view of the light source.

FIG. 22A is a side elevation of a light source used in a fourth embodiment of the present invention, and FIG. 22B is a plan view of the light source.

BEST MODE FOR CARRYING OUT THE INVENTION

The present invention will be described in detail below concerning the embodiments thereof with reference to the accompanying drawings.

Figure 1:
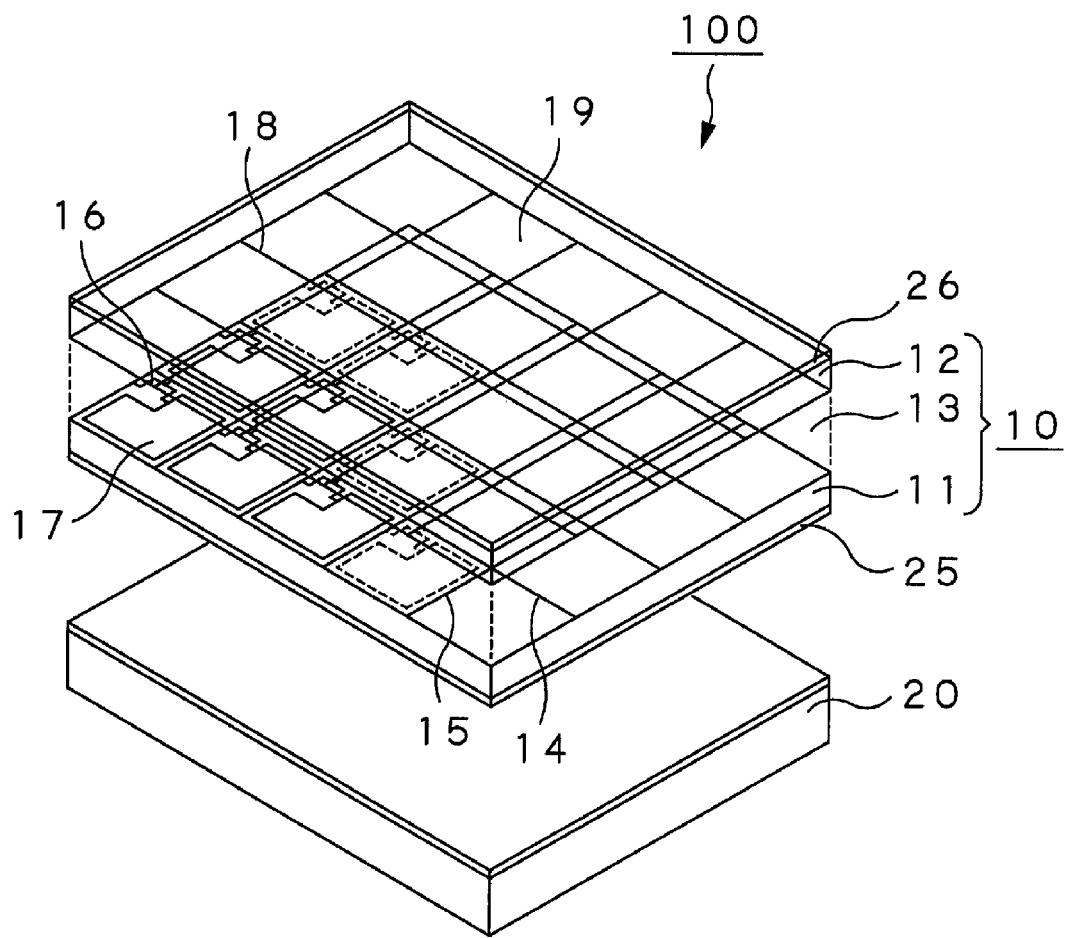
FIG. 1 is a perspective view of the color liquid crystal display device according to the present invention.

Referring now to FIG. 1, a backlighted color liquid crystal display device according to an embodiment of the present invention is illustrated, by way of example, in the form of a perspective view. It is generally indicated with a reference numeral 1.

As shown, the color liquid crystal display device 1 includes a transmission type liquid crystal panel 10, and a backlight device 20 provided on the rear side, as one side, of the liquid crystal panel 10. The user is to look at an image displayed on the liquid crystal panel 10 from the front side, as the other side, of the liquid crystal panel 10.

The liquid crystal panel 10 includes a TFT substrate 11 and opposed electrode substrate 12, formed from two transparent glass substrates or the like and disposed in pair opposite to each other, and a liquid crystal layer 13 of a twisted nematic liquid crystal sealed in a space between the TFT substrate 11 and electrode substrate 12.

The TFT substrate 11 has formed thereon signal lines 14 and scan lines 15 disposed in the shape of a matrix. Also, the TFT substrate 11 has formed thereon a thin film transistor (TFT) 16 as a switching element, disposed at each of intersections of the signal lines 14 and scan lines 15, and picture electrodes 17. The thin film transistors 16 are sequentially selected by the scan lines 15 to write picture signals supplied from the signal lines 14 to the picture electrodes 17.

On the other hand, the opposed electrode substrate 12 has opposed electrodes 18 and color filters 19 formed on the inner side thereof. It should be noted that the side of the liquid crystal panel 10 on which the TFT substrate 11 is disposed is taken as the rear side while the side on which the opposed electrodes 12 are disposed are taken as the front side.

In the above color liquid crystal display device 1, the liquid crystal panel 10 constructed as above is held between two polarization plates 25 and 26 and it is driven by the active matrix driving method while being lighted at the back thereof with white light emitted from the backlight device 20 to display a desired full-color image. It should be noted that the backlight device 20 will be described in detail later.

Figure 2:
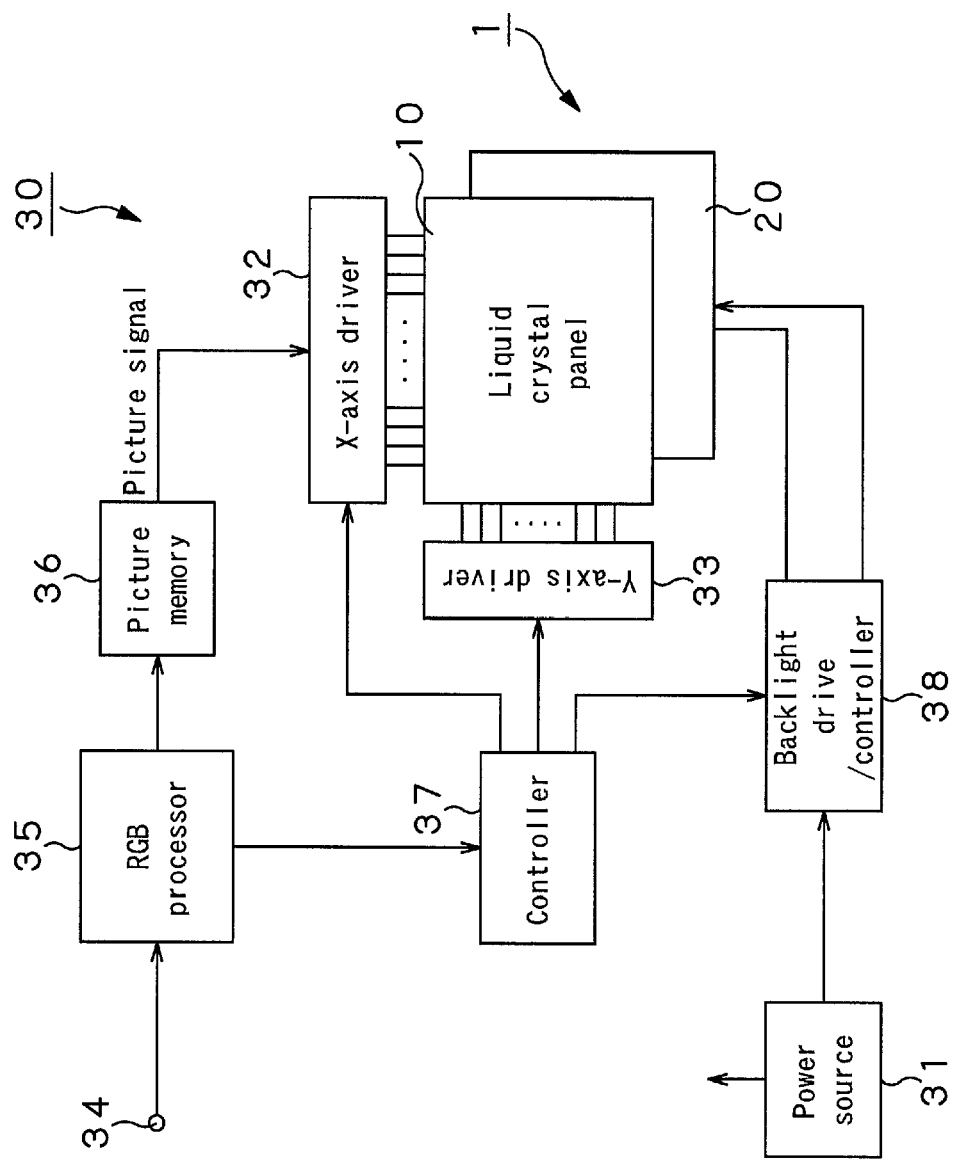
FIG. 2 is a block diagram of a drive circuit included in the liquid crystal display device.

The color liquid crystal display device 1 is driven by a drive circuit 30 illustrated in the form of an electrical block diagram in FIG. 2, for example.

As shown, the drive circuit 30 includes a power source 31 to supply a drive power to the liquid crystal panel 10 and backlight device 20, X- and Y-axis driver circuits 32 and 33 to drive the liquid crystal panel 10, RGB processor 35 which is supplied with external picture signals via an input terminal 34, picture memory 36 and controller 37 connected to the RGB processor 35, backlight drive/controller 38 to drive and control the backlight device 20, etc.

In the drive circuit 30, picture signals supplied via the input terminal 34 are subjected to signal processing such as chroma processing and the like in the RGB processor 35 to provide a composite signal, this composite signal is converted into an RGB separate signal suitable for driving the liquid crystal panel 10 and supplied to the controller 37 while being supplied to the X-axis driver circuit 32 via the picture memory 36. Also, the controller 37 controls the X- and Y-axis driver circuits 32 and 33 in a predetermined timing corresponding to the RGB separate signal to drive the liquid crystal panel 10 with the RGB separate signal supplied to the X-axis driver circuit 32 via the picture memory 36. Thus, the liquid crystal panel 10 displays a picture corresponding to the RGB separate signal.

FIRST EMBODIMENT

Next, the backlight device 20 will be explained.

Figure 3:
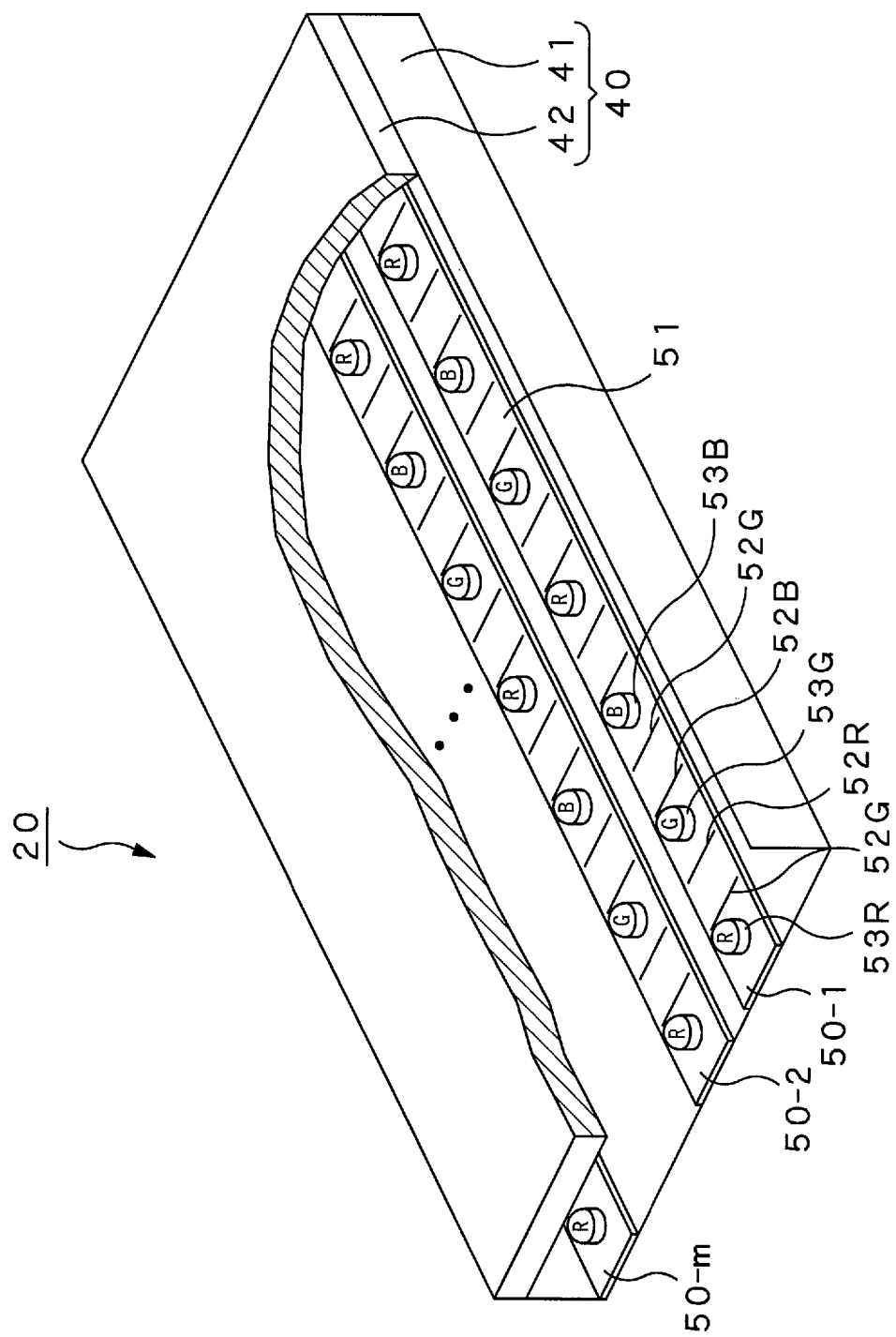
FIG. 3 is a partially fragmentary perspective view of the backlight device according to the present invention.

As shown in FIG. 3, the backlight device 20 according to the present invention includes a generally rectangular housing 40 and light sources 50-1 to 50-m (m is a natural number; the light sources will generically be referred to as "light sources 50" hereunder wherever it is not necessary to distinguish them from each other) provided on the bottom 40a of the housing 40. The backlight device 20 is of a so-called direct back light type in which light emitted from the light sources 50 provided on the bottom of the housing 40 is projected from the entire top of the housing 40 to light the liquid crystal panel 10.

According to this first embodiment, the housing 40 includes a bottom 40a and four sides thereof formed each from a reflecting plate 41, and a top formed from a diffusion plate 42.

When light emitted from the light sources 50 is incident upon the reflecting plate 41, the latter will reflect the incident light toward the diffusion plate 42.

The light emitted from the light sources 50 and light having been reflected from the reflecting plate 41 are incident upon the diffusion plate 42. The diffusion plate 42 diffuses the incident light to let them go out of the entire main side thereof (will also be referred to as "surface emission" hereunder). The liquid crystal panel 10 is thus lighted with the light emitted from the entire main side of the diffusion plate 42.

The light sources 50 emit red light, green light and blue light from which the white light is produced for emission from the diffusion plate 42. Each of the light sources 50 includes a rectangular substrate 51. As shown in FIG. 3, the substrate 51 is provided on the bottom 40a of the housing 40 so that its length aligns with the length of the housing 40.

On the substrate 51, there are disposed red light separating plates 52R, green light separating plates 52G, blue light separating plates 52B, red light emitting diodes (the "light emitting diode" will be referred to as "LED" hereunder) 53R, green light emitting diodes 53G and blue light emitting diodes 53B as shown in FIGS. 4A and 4B.

Note that in the following explanation, the red, green and blue light separating plates 52R, 52G and 52B will generically be referred to as "light separating plates 52" hereunder wherever it is not necessary to distinguish them from each other. Also, the red, green and blue LEDs 53R, 53G and 53B will generically be referred to as "LEDs 53" hereunder wherever it is not necessary to distinguish them from each other.

The red, green and blue LEDs 53R, 53G and 53B emit red, green and blue light, respectively. The backlight device 20 mixes together the red, green and blue light emitted from the red, green and blue LEDs 53R, 53G and 53B, respectively, to produce white light, and emits it from the entire surface of the diffusion plate 42 to light the liquid crystal panel 10.

Figure 5:
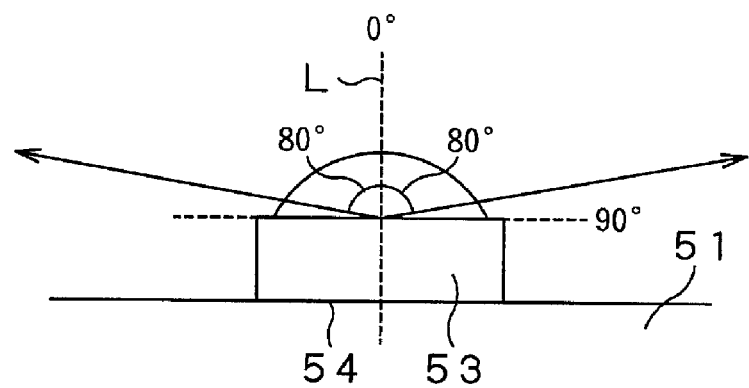
FIG. 5 is a schematic side elevation of a side-emission type LED (light emitting diode).

According to the embodiment of the present invention, LED 35 is a side-emission type one. As shown in FIG. 5, the side-emission type LED 53 is directive in a direction skewed from the optical axis thereof, that is, in a direction skewed from a direction orthogonal to the bottom of LED 53. In other words, the side-emission type LED 53 is so designed that in the luminance distribution of light emitted from LED, measured at different angles with the optical axis L being directed at an angle of 0 deg. and the bottom 54 being directed at an angle of 90 deg., the luminance is highest in a predetermined direction skewed toward the direction of 90 deg., not toward the direction of 0 deg.

The side-emission type LEDs 53 may be a standard side emitter (Luxeon Emitter Side Emitting (brand name) by LUMILEDS). The standard side emitter is designed such that in the luminance distribution of light emitted from LED, measured at different angles with the optical axis L being directed at an angle of 0 deg. and the bottom 54 being directed at an angle of 90 deg. as shown in FIG. 5, the luminance is highest at an angle of 80 deg. That is, the standard side emitter has directivity in a skewed direction skewed 80 deg. from the optical axis L The majority of light emitted from each of the side-emission type LEDs used as LEDs 53 is incident upon the light separating plates 52. The light separating plate 52 reflects a part of the light emitted from the LED 53 while transmitting a part of the light, so that the light path is split.

Also, according to this embodiment of the present invention, LEDs 53 should desirably be capable of emitting light higher in luminance than usual. The higher luminance of the light than usual results in a satisfactory luminance of the light separated by the light separating plate 52 and also in a satisfactory luminance of the light surface-emitted from the diffusion plate 42.

The standard side emitter emits light whose luminance is about 10 to 20 times higher than the light emitted from the ordinary LEDs. More specifically, the standard side emitter is technically specified such that the red LED emits red light of 40 lumens in intensity, the green LED emits green light of 27 lumens in intensity and the blue LED emits blue light of 9 lumens in intensity. Therefore, in case the standard side emitter is used as each of LEDs 53, light separated by the light separating plate 52 will have a high luminance.

Here, the explanation will be made with reference to FIG. 4 again. The red light separating plate 52R transmits 50% of incident red light while reflecting 50% of the red light and transmits 100% of incident green and blue light. By reflecting 50% of the incident red light, the red light separating plate 52R forms a virtual image 53R' of the red LED 53R which is an apparent source of the reflected red light.

More specifically, the red light separating plate 52R forms a virtual image 53R' of the red LED 53R in a position opposite to the red LED 53R, having emitted the red light incident upon the red light separating plate 52R, with reference to the red light separating plate 52R. In other words, the red light separating plate 52R forms the virtual image 53R' of the red LED 53R in a position plane-symmetrical with respect to the red LED 53R having emitted the red light incident upon the red light separating plate 52R with the light-incident surface of the red light separating plate 52R being taken as the plane of symmetry.

The green light separating plate 52G transmits 50% of incident green light while reflecting 50% of the green light and transmits 100% of incident blue and red light. By reflecting 50% of the incident green light, the green light separating plate 52G forms a virtual image 53G' of the green LED 53G which is an apparent source of the reflected green light.

More specifically, the green light separating plate 52G forms a virtual image 53G' of the green LED 53G in a position opposite to the green LED 53G, having emitted the green light incident upon the green light separating plate 52G, with reference to the green light separating plate 52G.

Also, the blue light separating plate 52B transmits 50% of incident blue light while reflecting 50% of the blue light and transmits 100% of incident red and green light. By reflecting 50% of the incident blue light, the blue light separating plate 52B forms a virtual image 53B' of the blue LED 53B which is an apparent source of the reflected blue light.

More specifically, the blue light separating plate 52B forms a virtual image 53B' of the blue LED 53B in a position opposite to the blue LED 53B, having emitted the blue light incident upon the blue light separating plate 52B, with reference to the blue light separating plate 52B.

Note that in the following explanation, the virtual images 53R', 53G' and 53B' of the red, green and blue LEDs 53R, 53G and 53B, respectively, will be referred to as "virtual images 53'" hereunder wherever it is not necessary to distinguish them from each other.

The light separating plate 52 is formed from an optical multilayer film formed by stacking together a high-refractivity material of more than 1.5 in refractivity and low-refractivity material of less than 1.5 in refractivity, an optical single-layer film formed from a metallic material and the like.

According to the embodiment of the present invention, the light separating plate 52 includes an optical multilayer film formed from $Nb_2O_5$ and $SiO_2$ stacked together and two glass substrates between which the optical multilayer film is held tight. The light separating plate 52 used in the embodiment is formed by forming, on one of the glass substrates, an optical multilayer film formed from an $Nb_2O_5$ and $SiO_2$ alternately stacked together by vacuum deposition or sputtering, and by stacking the other glass substrate on the optical multilayer film in such a manner that no air will enter between the film and other glass substrate.

Also, both the one and other of the main sides of the light separating plate 52 should preferably be equal in optical characteristics such as transmittance and reflectance of incident light to each other. When the optical characteristics at the one main side are equal to those at the other main side, the difference in transmittance and reflectance between the main sides, caused by absorption of the light incident upon the light separating plate 52, can be reduced.

Also, since the standard side emitter is used as LEDs 53 in this embodiment, the light separating plate 52 is formed to have desired optical characteristics for light incident at an angle of 10 deg.

Figure 6A:
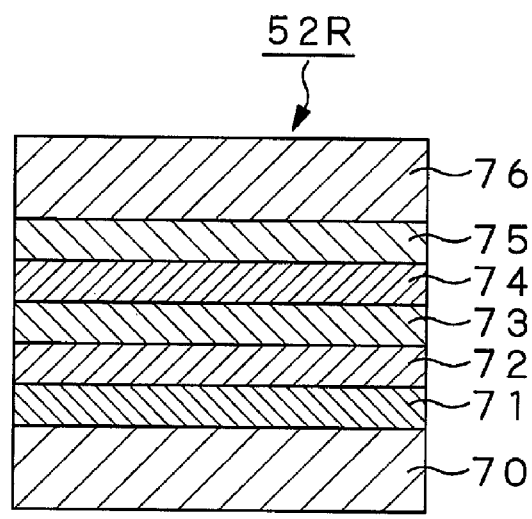
FIG. 6A is a sectional view of a red light transmitting/reflecting plate included in an embodiment of the present invention, and FIG. 6B graphically illustrates the transmittance of the red light incident upon the red light transmitting/reflecting plate.

More specifically, the red light separating plate 52R includes, for example, a 219 nm-thick first $Nb_2O_5$ layer 71, 169 nm-thick first $SiO_2$ layer 72, 189 nm-thick second $Nb_2O_5$ layer 73, 169 nm-thick second $SiO_2$ layer 74 and 219 nm-thick third $Nb_2O_5$ layer 75 formed one after another by sputtering or vacuum deposition on a first glass layer 70, and a second glass layer 76 stacked on the third $Nb_2O_5$ layer 75, as shown in FIG. 6A.

The transmittance of the red light separating plate 52R formed as above was measured with incident light of different wavelengths. As is known from the results of the measurement, the red light separating plate 52R transmits about 50% of the red light incident from the first glass substrate 70 while reflecting about 50% of the red light and transmits almost 100% of green and blue light as indicated with a reference symbol P1 in FIG. 6B. Also, the red light separating plate 52R transmits about 50% of the red light incident from the second glass substrate 76 while reflecting about 50% of the red light and transmits almost 100% of green and blue light, which is not illustrated.

Figure 7A:
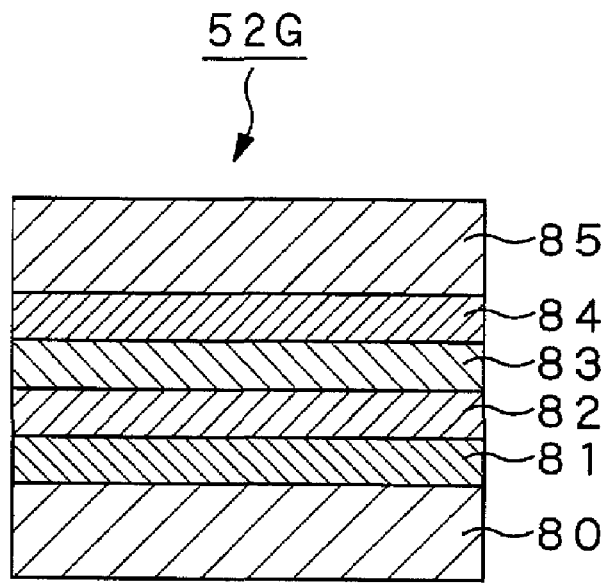
FIG. 7A is a sectional view of a green light transmitting/reflecting plate included in the embodiment of the present invention, and FIG. 7B graphically illustrates the transmittance of the green light incident upon the green light transmitting/reflecting plate.

Also, the green light separating plate 52G includes, for example, a 96 nm-thick first $SiO_2$ layer 81, 308 nm-thick first $Nb_2O_5$ layer 82, 96 nm-thick second $SiO_2$ layer 83 and 308 nm-thick second $Nb_2O_5$ layer 84 formed one after another by sputtering or vacuum deposition on a first glass layer 80, and a second glass layer 85 stacked on the second $Nb_2O_5$ layer 84, as shown in FIG. 7A.

The transmittance of the green light separating plate 52G formed as above was measured with incident light of different wavelengths. As is known from the results of the measurement, the green light separating plate 52G transmits about 50% of the green light incident from the first glass substrate 80 while reflecting about 50% of the green light and transmits almost 100% of blue and red light as indicated a reference symbol P2 in FIG. 7B. Also, the green light separating plate 52G transmits about 50% of the green light incident from the second glass substrate 85 while reflecting about 50% of the green light and transmits almost 100% of blue and red light, which is not illustrated.

Figure 8A:
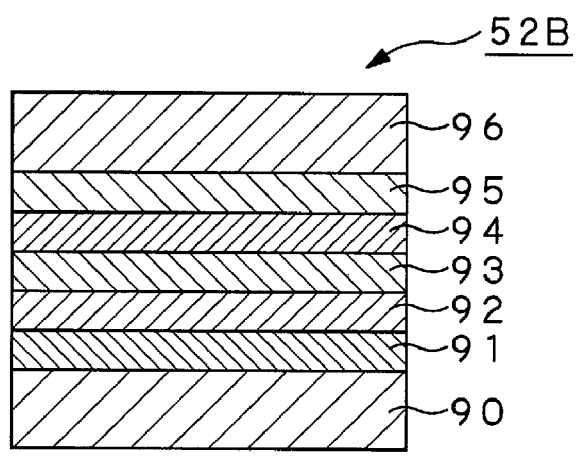
FIG. 8A is a sectional view of a blue light transmitting/reflecting plate included in the embodiment of the present invention, and FIG. 8B graphically illustrates the transmittance of the blue light incident upon the blue light transmitting/reflecting plate.

Also, the blue light separating plate 52B includes, for example, a 168 nm-thick first $Nb_2O_5$ layer 91, 32 nm-thick first $SiO_2$ layer 92, 168 nm-thick second $Nb_2O_5$ layer 93, 32 nm-thick second $SiO_2$ layer 94 and 168 nm-thick third $Nb_2O_5$ layer 95 formed one after another by sputtering or vacuum deposition on a first glass layer 90, and a second glass layer 96 stacked on the third $Nb_2O_5$ layer 95, as shown in FIG. 8A.

The transmittance of the blue light separating plate 52G formed as above was measured with incident light of different wavelengths. As is known from the results of the measurement, the blue light separating plate 52B formed as above transmits about 50% of the blue light incident from the first glass substrate 90 while reflecting about 50% of the blue light and transmits almost 100% of red and green light as indicated with a reference symbol P3 in FIG. 8B. Also, the blue light separating plate 52B transmits about 50% of the blue light incident from the second glass substrate 96 while reflecting about 50% of the blue light and transmits almost 100% of red and green light, which is not illustrated.

Figure 6B:
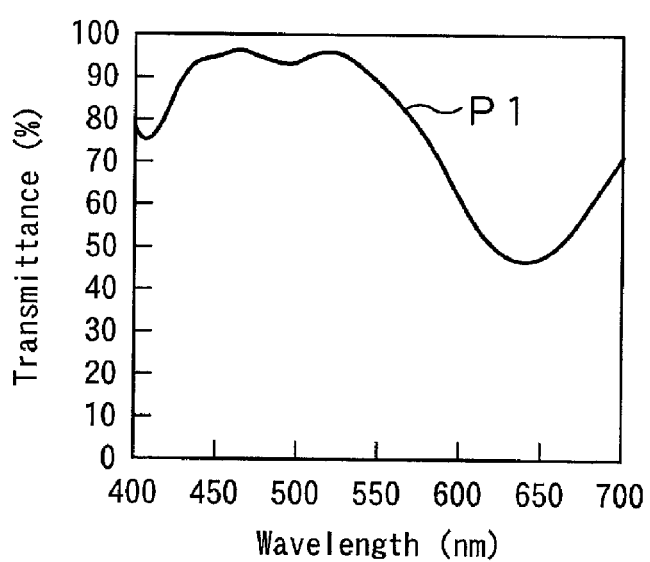
Figure 7B:
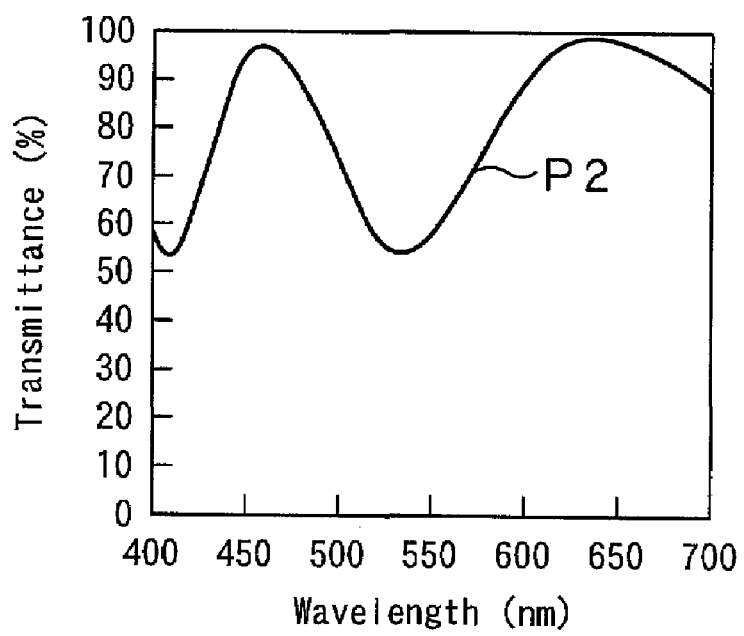
Figure 8B:
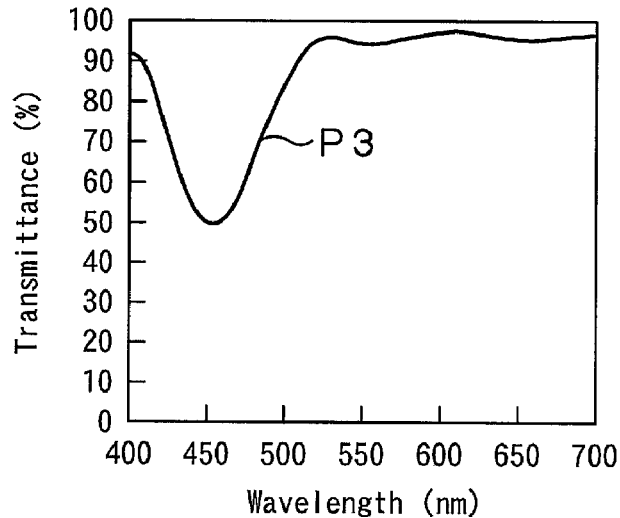

Note that in FIGS. 6B, 7B and 8B, the wavelength is indicated along the horizontal axis while the light transmittance is indicated along the vertical axis.

Figure 9:
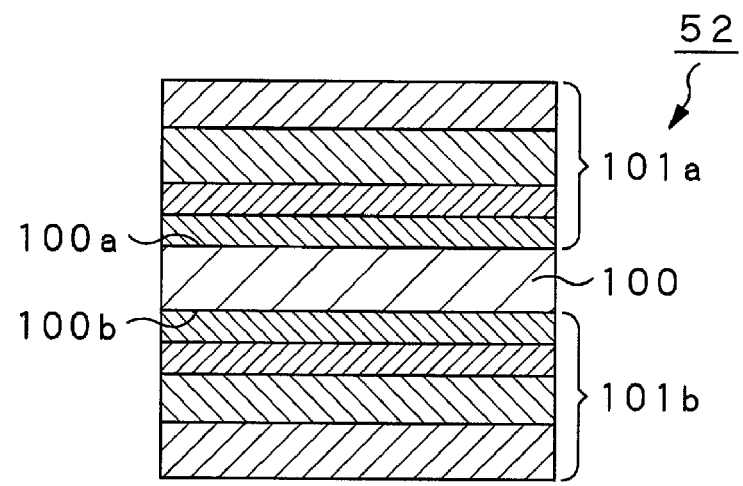
FIG. 9 is a sectional view of a reflecting plate having an optical multilayer film formed on either side of a glass substrate.

Note that the light separating plate 52 may include optical multilayer films 101a and 101b formed on both main sides 100a and 100b of a glass substrate 100 by sputtering, vacuum deposition or the like as shown in FIG. 9, for example. Also in this case, the one and other main sides of the light separating plate 52 can be made equal in optical characteristics such as transmittance and reflectance of incident light to each other.

Also, the light separating plate 52 shown in FIGS. 6A, 7A, 8A and 9 is formed plane-symmetrical with respect to the center plane between the one and other main sides thereof. Even in case he light separating plate 52 is not formed plate-symmetrical with respect to the central plane between the one and other main sides thereof, the one and other main sides of can be made equal in optical characteristics such as transmittance and reflectance of incident light to each other.

Figure 10A:
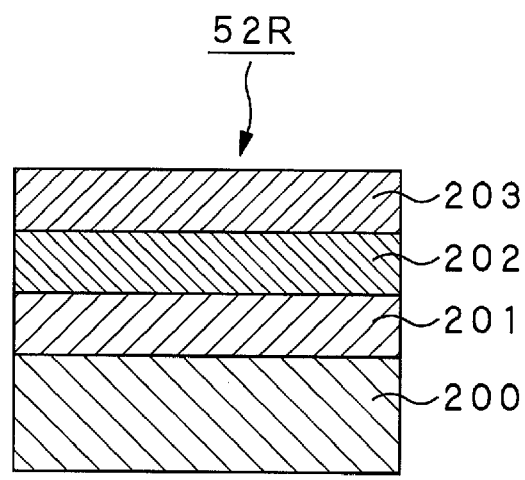
FIG. 10A is a sectional view of a red light transmitting/reflecting plate formed plane-symmetrical with respect to a central plane between one and other sides thereof.

More specifically, the red light separating plate 52R is made by forming, on a 188 μm-thick polyethylene terephthalate substrate 200 hard-coated with an 8 μm-thick acrylic UV-curable resin, a 99.59 nm-thick first $Nb_2O_5$ layer 201, 97.06 nm-thick $SiO_2$ layer 202 and 99.57 nm-thick second $Nb_2O_5$ layer 203 one after another by sputtering, vacuum deposition or the like as shown in FIG. 10A, for example.

Figure 10B:
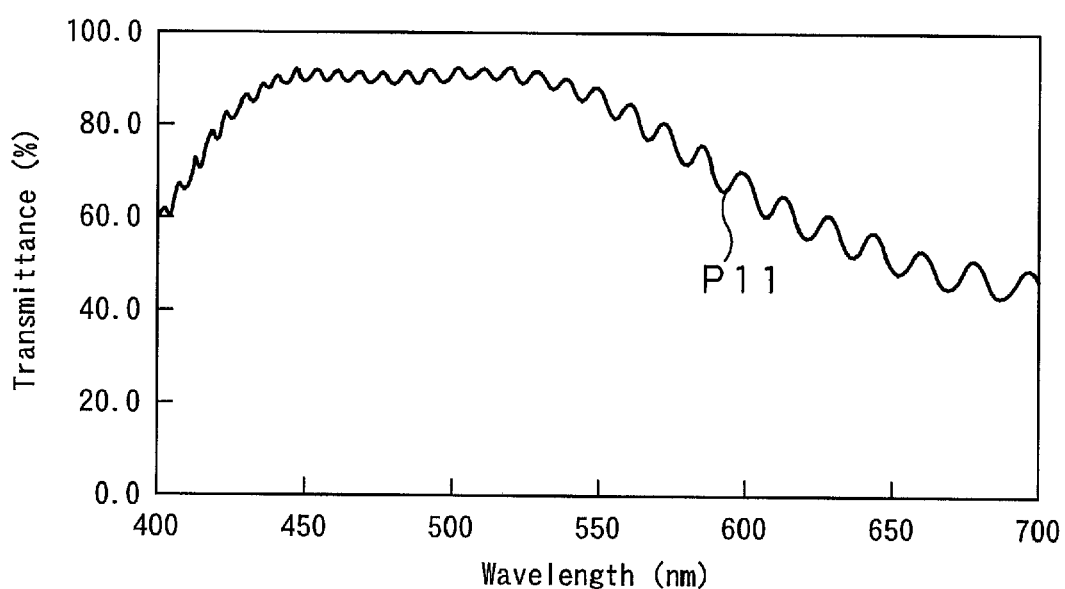
FIG. 10B graphically illustrates the transmittance of the red light incident upon the red light transmitting/reflecting plate.

The transmittance of the red light separating plate 52R formed as above was measured with incident light of different wavelengths. As is known from the results of the measurement, the red light separating plate 52R transmits about 50% of the red light incident from the polyethylene terephthalate substrate 200 while reflecting about 50% of the red light and transmits almost 100% of green and blue light as indicated with a reference symbol P11 in FIG. 10B. Also, the red light separating plate 52R transmits about 50% of the red light incident from the second $N_2O_5$ layer 203 while reflecting about 50% of the red light and transmits almost 100% of green and blue light, which is not illustrated.

Figure 11A:
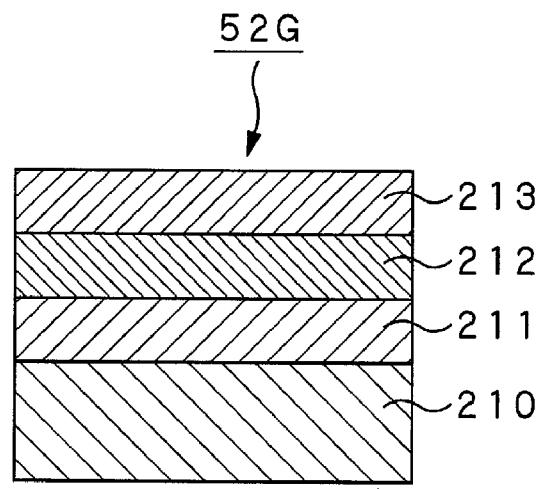
FIG. 11A is a sectional view of a green light transmitting/reflecting plate formed plane-symmetrical with respect to a central plane between one and other sides thereof.

Also, the green light separating plate 52G is made by forming, on a 188 μm-thick polyethylene terephthalate substrate 210 hard-coated with an 8 μm-thick acrylic UV-curable resin, a 195.47 nm-thick first $Nb_2O_5$ layer 211, 36.14 nm-thick $SiO_2$ layer 212 and 189.12 nm-thick second $Nb_2O_5$ layer 213 one after another by sputtering, vacuum deposition or the like as shown in FIG. 11A, for example.

Figure 11B:
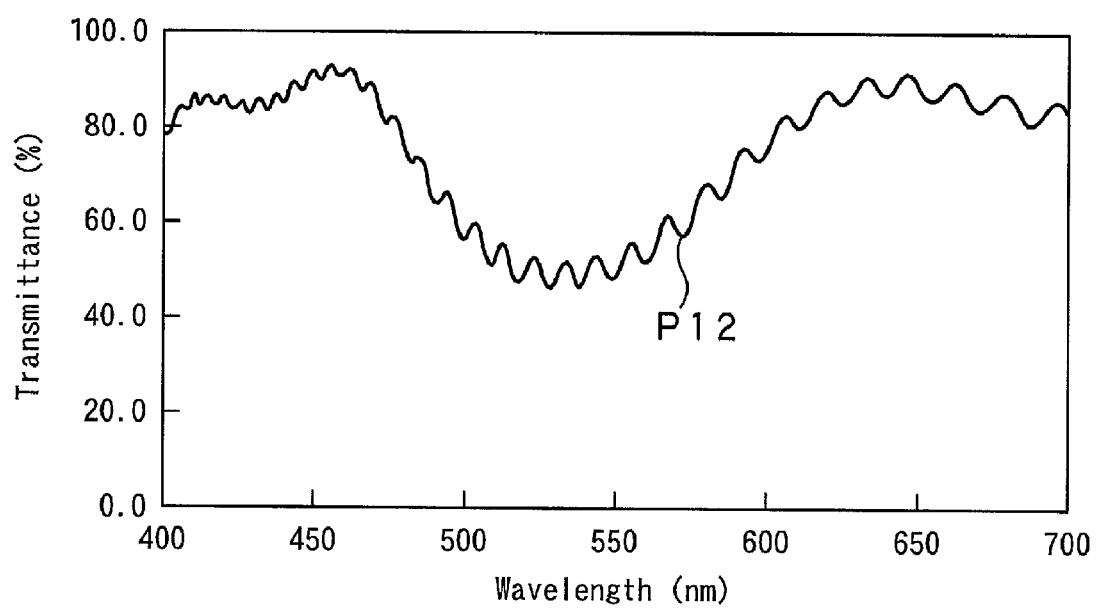
FIG. 11B graphically illustrates the transmittance of the green light incident upon the green light transmitting/reflecting plate.

The transmittance of the green light separating plate 52G formed as above was measured with incident light of different wavelengths. As is known from the results of the measurement, the green light separating plate 52G transmits about 50% of the red light incident from the polyethylene terephthalate substrate 210 while reflecting about 50% of the green light and transmits almost 100% of blue and red light as indicated with a reference symbol P12 in FIG. 11B. Also, the green light separating plate 52G transmits about 50% of the green light incident from the second $Nb_2O_5$ layer 213 while reflecting about 50% of the green light and transmits almost 100% of blue and red light, which is not illustrated.

Figure 12A:
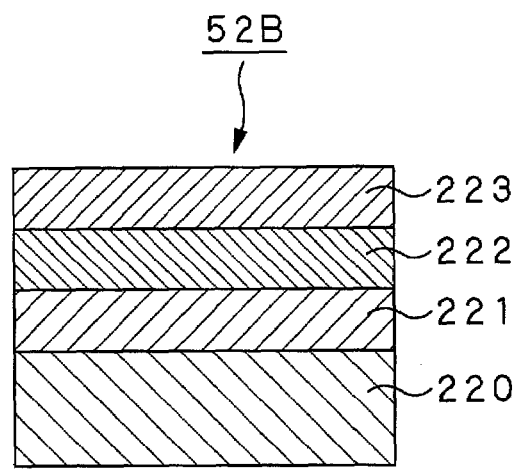
FIG. 12A is a sectional view of a blue light transmitting/reflecting plate formed plane-symmetrical with respect to a central plane between one and other sides thereof.

Also, the blue light separating plate 52B is made by forming, on a 188 μm-thick polyethylene terephthalate substrate 220 hard-coated with an 8 μm-thick acrylic UV-curable resin, a 124.33 nm-thick first $Nb_2O_5$ layer 221, 123.60 nm-thick $SiO_2$ layer 222 and 122.01 nm-thick second $Nb_2O_5$ layer 223 one after another by sputtering, vacuum deposition or the like as shown in FIG. 12A, for example.

Figure 12B:
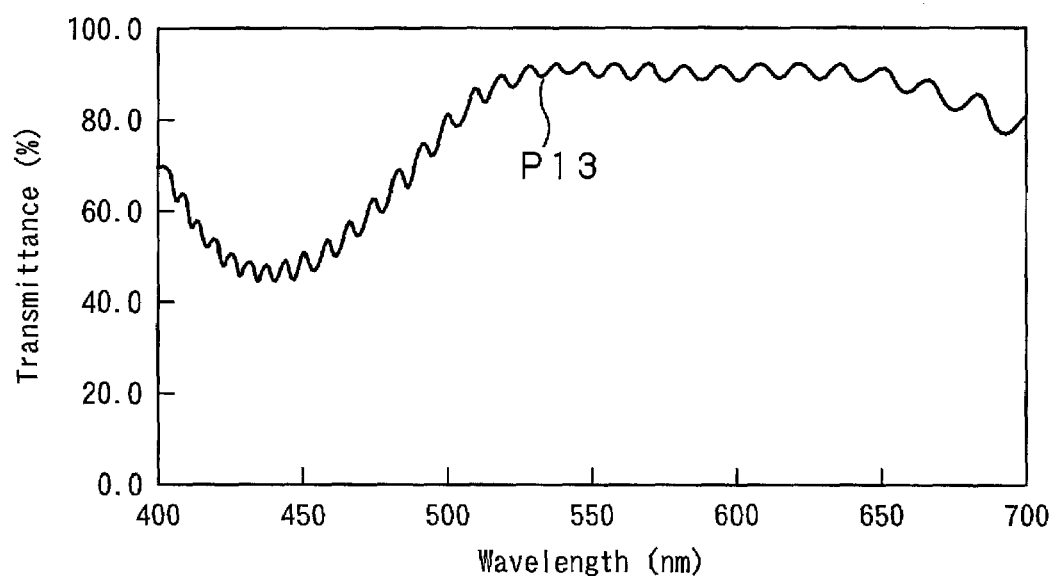
FIG. 12B graphically illustrates the transmittance of the blue light incident upon the blue light transmitting/reflecting plate.

The transmittance of the blue light separating plate 52B formed as above was measured with incident light of different wavelengths. As is known from the results of the measurement, the blue light separating plate 52B transmits about 50% of the blue light incident from the polyethylene terephthalate substrate 220 while reflecting about 50% of the blue light and transmits almost 100% of red and green light as indicated with a reference symbol P13 in FIG. 12B. Also, the blue light separating plate 52B transmits about 50% of the blue light incident from the second $Nb_2O_5$ layer 223 while reflecting about 50% of the blue light and transmits almost 100% of red and green light, which is not illustrated.

Here will be explained the disposition of the red, green and blue light separating plates 52R, 52G and 52B, disposition of the red, green and blue LEDs 53R, 53G and 53B, virtual images 53R', 53G' and 53B' of the red, green and blue LEDs 53R, 53G and 53B, respectively, formed by the red, green and blue light separating plates 52R, 52G and 52B, respectively.

Figure 13:
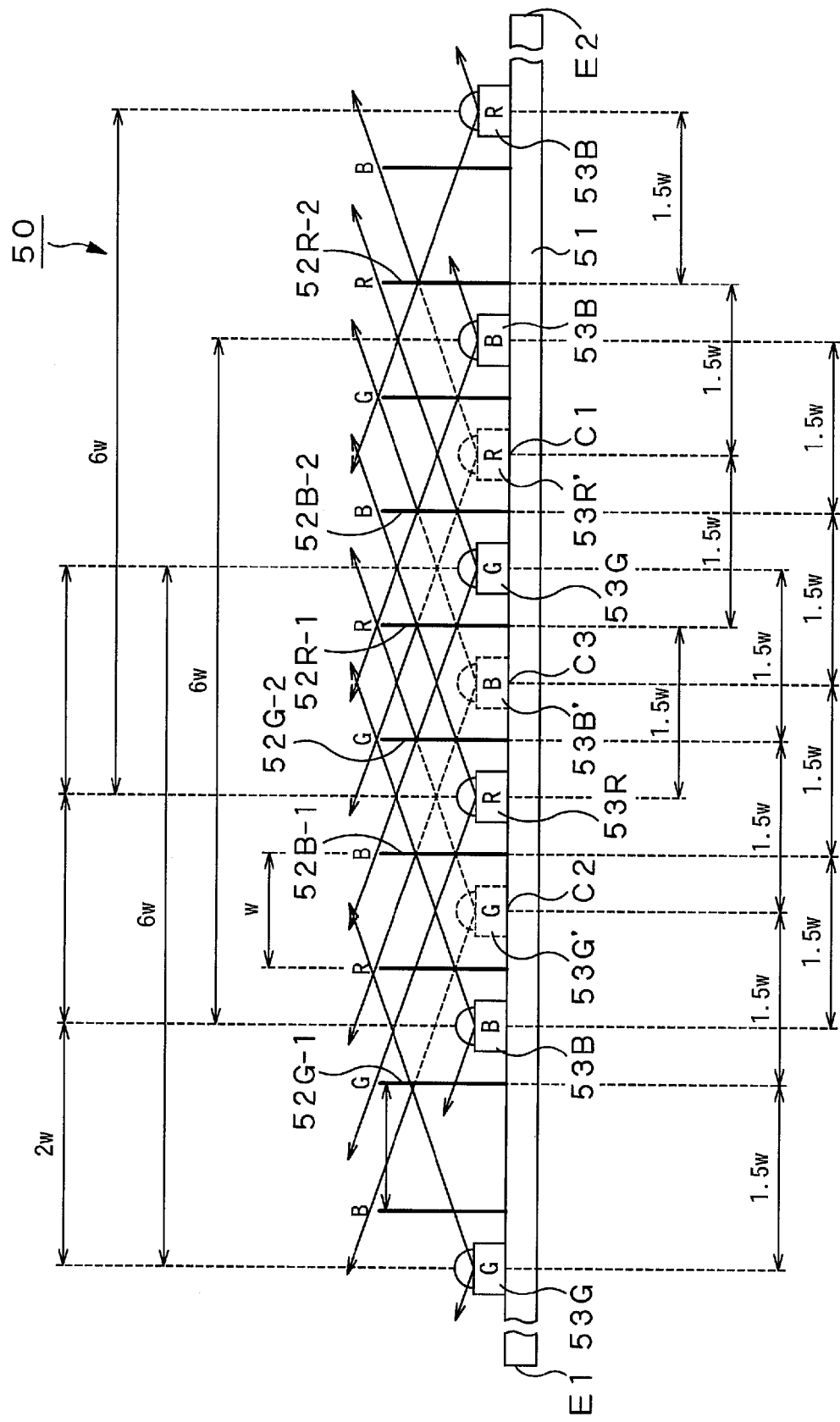
FIG. 13 explains an example disposition of LEDs and light separating plates included in the light source, and position of a virtual image formed by the light separating plates.

As shown in FIG. 13, the red, green and blue light separating plates 52R, 52G and 52B are alternately disposed with a pitch of w (w>0) in array longitudinally of the substrate 51 for the main sides thereof to be opposite to each other. That is, the red, green and blue light separating plates 52R, 52G and 52B are disposed with a pitch of 3 w in such geometry that they are w apart from each other.

The red LEDs 53R are disposed alternately one at every other center between the green and blue light separating plates 52G and 52B disposed between two red light separating plates 52R disposed in positions 3 w apart from each other. That is, the red LEDs 53R are disposed with a pitch of 6 w at the center between the green and blue light separating plates 52G and 52B.

Also, the green LEDs 53G are disposed alternately one at every other center between the blue and red light separating plates 52B and 52R disposed between two green light separating plates 52G disposed in positions 3 w apart from each other, so that the optical axis of the green LED 53G and that of the red LED 53R are 2 w apart from each other. That is, the green LEDs 53G are disposed with a pitch of 6 w at the center between the blue and green light separating plates 52B and 52G.

Also, the blue LEDs 53B are disposed alternately one at every other center between the red and green light separating plates 52R and 52G disposed between two blue light separating plates 52B disposed in positions 3 w apart from each other in such a manner that the distance between the optical axes of the blue and red LEDs 53B and 53R is 2 w and that between the optical axes of the blue and green LEDs 53B and 53G is 2 w. That is, the blue LEDs 53B are disposed with a pitch of 6 w at the center between the red and green light separating plates 52R and 52G.

Since the light separating plates 52 and LEDs 53 are disposed as above, one, disposed at one end (will be referred to as "first end" hereunder) E1 of the substrate 51, of the two red light separating plates 52R (will be referred to as "a pair of red light separating plates" hereunder wherever they should generically be referred to) disposed in positions 3 w apart from each other and having no red LED 53R disposed at the center between them, has a red LED 53R disposed in a position 1.5 w therefrom in the direction of the first end E1. Also, the red light separating plate 52R disposed at the other end (will be referred to as "second end" hereunder) E2 of the substrate 51 has a red LED 53R disposed in a position 1.5 w apart therefrom in the direction of the second end E2.

Note that in the following explanation, one, disposed at the side of the first end E1, of the pair of red light separating plates 52R will be referred to as "first red light separating plate 52R-1" hereunder, while the other red light separating plate 52R disposed at the second end E2 will be referred to as "second red light separating plate 52R-2" hereunder.

The first red light separating plate 52R-1 transmits 50% of light emitted from the red LED 53R disposed in a position 1.5 w apart therefrom in the direction of the first end E1 while reflecting 50% of the light. Extended in a direction opposite to the traveling direction of the red light having been reflected by the first red light separating plate 52R-1, the light path of the red light will intersect with a position in a position 1.5 w apart from the first red light separating plate 52R-1 in the direction of the second end E2, that is, a position C1 at the center between the green and blue light separating plates 52G and 52B disposed between the pair of red light separating plates 52R and in which no LED 53 is disposed.

Therefore, the position C1 between the green and blue light separating plates 52G and 52B disposed between the pair of red light separating plates 52R and in which no LED 53 is disposed is an apparent source of the red light having been reflected by the first red light separating plate 52R-1.

The second red light separating plate 52R-2 transmits 50% of light emitted from the red LED 53R disposed in a position 1.5 w apart therefrom in the direction of the second end E2 while reflecting 50% of the light. Extended in a direction opposite to the traveling direction of the red light having been reflected by the second red light separating plate 52R-2, the light path of the red light will intersect a position 1.5 w apart from the second red light separating plate 52R-2 in the direction of the first end E1, that is, a position C1 at the center between the green and blue light separating plates 52G and 52B disposed between the pair of red light separating plates 52R and in which no LED 53 is disposed.

Therefore, the position C1 at the center between the green and blue light separating plates 52G and 52B disposed between the pair of red light separating plates 52R and in which no LED 53 is disposed is an apparent source of the red light having been reflected by the second red light separating plate 52R-2.

As known from the above explanation, both the apparent source of the red light having been reflected by the first red light separating plate 52R-1 and that of the red light having been reflected by the second red light separating plate 53R-2 are the position C1 at the center between the green and blue light separating plates 52G and 52B disposed between the pair of red light separating plates 52R and in which no LED 53 is disposed.

Therefore, in the position C1 at the center between the green and blue light separating plates 52G and 52B and in which no LED 53 is disposed, there is formed a virtual image 53R' of the red LED 53R which is an apparent source of the red light having been reflected by the two red light separating plates 52R in positions 1.5 w apart from the position C1.

One, disposed at the first end E1 of the substrate 51, of the two green light separating plates 52G (will be referred to as "a pair of green light separating plates" hereunder wherever they should generically be referred to) disposed in positions 3 w apart from each other and having no green LED 53G disposed between them has a green LED 53G disposed in a position 1.5 w apart therefrom in the direction of the first end E1. Also, the green light separating plate 52G disposed at the second end E2 of the substrate 51 has a green LED 53G disposed in a position 1.5 w apart therefrom in the direction of the second end E2.

In the following explanation, one, disposed at the side of the second end E2, of the pair of green light separating plates 52G will be referred to as "first green light separating plate 52G-1" hereunder wherever it is necessary to distinguish them from each other, while the other green light separating plate 52G disposed at the second end E2 will be referred to as "second green light separating plate 52G-2" hereunder.

The first green light separating plate 52G-1 transmits 50% of light emitted from the green LED 53G disposed in a position 1.5 w apart therefrom in the direction of the first end E1 while reflecting 50% of the light. Extended in a direction opposite to the traveling direction of the green light having been reflected by the first green light separating plate 52G-1, the light path of the green light will intersect with a position in a position 1.5 w apart from the first green light separating plate 52G-1 in the direction of the second end E2, that is, a position C2 at the center between the blue and red light separating plates 52B and 52R disposed between the pair of green light separating plates 52G and in which no LED 53 is disposed.

Therefore, the position C2 at the center between the blue and red light separating plates 52B and 52R disposed between the pair of green light separating plates 52G and in which no LED 53 is disposed is an apparent source of the green light having been reflected by the first green light separating plate 52G-1.

The second green light separating plate 52G-2 transmits 50% of light emitted from the green LED 53G disposed in a position 1.5 w apart therefrom in the direction of the second end E2 while reflecting 50% of the light. Extended in a direction opposite to the traveling direction of the green light having been reflected by the second green light separating plate 52G-2, the light path of the green light will intersect with a position in a position 1.5 w apart from the second green light separating plate 52G-2 in the direction of the first end E1, that is, a position C2 at the center between the blue and red light separating plates 52B and 52R disposed between the pair of green light separating plates 52G and in which no LED 53 is disposed.

Therefore, the position C2 at the center between the blue and red light separating plates 52B and 52R disposed between the pair of green light separating plates 52G and in which no LED 53 is disposed is an apparent source of the green light having been reflected by the second green light separating plate 52G-2.

As known from the above explanation, both the apparent source of the green light having been reflected by the first green light separating plate 52G-1 and that of the green light having been reflected by the second green light separating plate 53G-2 are the position C2 at the center between the blue and red light separating plates 52B and 52R disposed between the pair of green light separating plates 52G and in which no LED 53 is disposed.

Therefore, in the position C2 at the center between the blue and red light separating plates 52B and 52R and in which no LED 53 is disposed, there is formed a virtual image 53G' of the green LED 53G which is an apparent source of the green light having been reflected by the two green light separating plates 52G in a position 1.5 w apart from the position C2.

Also, one, disposed at the side of the first end E1, of the two blue light separating plates 52B (will be referred to as "a pair of blue light separating plates" hereunder wherever they should generically be referred to) disposed in positions 3 w apart from each other and having no blue LED 53B disposed between them has a blue LED 53B disposed in a position 1.5 w apart therefrom in the direction of the first end E1. Also, a blue LED 53B is disposed in a position 1.5 w in the direction of the second end E2 from the other blue light separating plate 52B disposed at the side of the second end E2.

Note that in the following explanation, one, disposed at the side of the first end E1, of the pair of blue light separating plates 52B will be referred to as "first blue light separating plate 52B-1" hereunder, while the other blue light separating plate 52B disposed at the second end E2 will be referred to as "second blue light separating plate 52B-2" hereunder.

The first blue light separating plate 52B-1 transmits 50% of light emitted from the blue LED 53B disposed in a position 1.5 w apart therefrom in the direction of the first end E1 while reflecting 50% of the light. Extended in a direction opposite to the traveling direction of the blue light having been reflected by the first blue light separating plate 52B-1, the light path of the blue light will intersect with a position in a position 1.5 apart from the first blue light separating plate 52B-1 in the direction of the second end E2, that is, a position C3 at the center between the red and green light separating plates 52R and 52G disposed between the pair of blue light separating plates 52B and in which no LED 53 is disposed.

Therefore, the position C3 at the center between the red and green light separating plates 52R and 52G disposed between the pair of blue light separating plates 52B and in which no LED 53 is disposed is an apparent source of the blue light having been reflected by the first blue light separating plate 52B-1.

The second blue light separating plate 52B-2 transmits 50% of light emitted from the blue LED 53B disposed in a position 1.5 w apart therefrom in the direction of the second end E2 while reflecting 50% of the light. Extended in a direction opposite to the traveling direction of the blue light having been reflected by the second blue light separating plate 52B-2, the light path of the blue light will intersect with a position in a position 1.5 apart from the second blue light separating plate 52B-2 in the direction of the second end E1, that is, the position C3 at the center between the red and green light separating plates 52R and 52G disposed between the pair of blue light separating plates 52B and in which no LED 53 is disposed.

Therefore, the position C3 at the center between the red and green light separating plates 52R and 52G disposed between the pair of blue light separating plates 52B and in which no LED 53 is disposed is an apparent source of the blue light having been reflected by the second blue light separating plate 52G-2.

As known from the above explanation, both the apparent source of the blue light having been reflected by the first blue light separating plate 52B-1 and that of the blue light having been reflected by the second blue light separating plate 53B-2 are the position C3 at the center between the red and green light separating plates 52R and 52G disposed between the pair of blue light separating plates 52B and in which no LED 53 is disposed.

Therefore, in the position C3 at the center between the red and green light separating plates 52R and 52G and in which no LED 53 is disposed, there is formed a virtual image 53B' of the blue LED 53B which is an apparent source of the blue light having been reflected by the two blue light separating plates 52B in positions 1.5 w apart from the position C3.

Since the red, green and blue LEDs 53R, 53G and 53B and the red, green and blue light separating plates 52R, 52G and 52B are disposed in the above-mentioned geometry, the backlight device 20 forms the virtual image 53B' of the blue LED 53B between the red and green LEDs 53R and 53G, virtual image 53R' of the red LED 53R between the green and blue LEDs 53G and 53B and virtual image 53G' of the green LED 53G between the blue and red LEDs 53B and 53R.

That is to say, since the virtual image 53' of LED 53 is formed between LEDs 53 disposed on the substrate 51 in the light source 50, the number of apparent LEDs 53 can be increased. Because of this increased number of the apparent LEDs 53, a wider area can be covered by a small number of LEDs 53.

Therefore, the backlight device 20 can assure a satisfactory performance with a smaller number of LEDs 53 than that in a backlight device not including the light separating plates 52. For example, it is recommended that the standard side emitters (by the LUMILEDS) should be disposed with a pitch of 12 mm, but LEDs 53 may be disposed with a pitch of 24 mm in the light sources 50, so that the number of LEDs 53 may be about a half of the number of the standard side emitters.

Since the number of LEDs 53 may be reduced as above, the backlight device 20 can be produced with a reduced cost. Also, the backlight device 20 can be operated with a less power consumption.

Also, the virtual image 53' is formed between LEDs 53 in the light sources 50 so that the red, green and blue LEDs 53R, 53G and 53B are alternately disposed. Therefore, the backlight device 20 including the light sources 50 can efficiently mix the red, green and blue light emitted from the corresponding LEDs 53 to produce white light.

Note that the red, green and blue LEDs 53R, 53G and 53B are disposed between the light separating plates 52 for the distance between the optical axes of the red and green LEDs 53 to be w, distance between the optical axes of the green and blue LEDs 53 to be w and the distance between the optical axes of the blue and red LEDs 53 to be 4 w, as shown in FIGS. 14A and 14B, for example.

Also in this geometry of LED disposition, the virtual images 53' are formed so that the red, green and blue LEDs 53R, 53G and 53B will be disposed alternately between LEDs 53. Namely, the red light, green light and blue light emitted from LEDs 53 can efficiently be mixed to produce white light.

Figure 15:
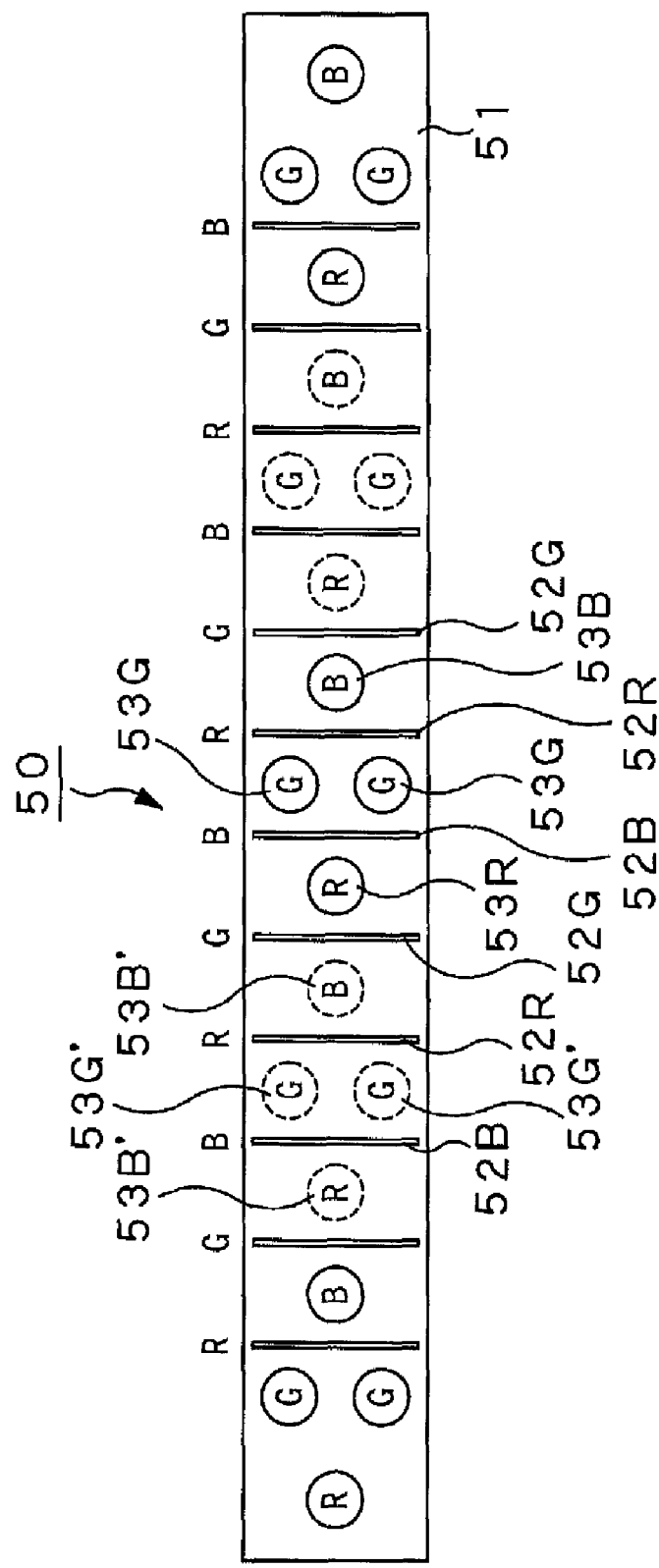
FIG. 15 is a plan view showing still another example disposition of LEDs included in the light source.

Also, one blue LED 53B may be disposed between the red and green light separating plates 52R and 52G, one red LED 53R be disposed between the green and blue light separating plates 52G and 52B, and two green LEDs 53G be disposed between the blue and red light separating plates 52B and 52R as shown in FIG. 15.

With the numbers of the green LEDs 53G disposed on the substrate 51 being double that of each of the red and blue LEDs 53R and 53B, the percentage of the green light included in the light emitted from the liquid crystal panel 10 is higher. By increasing the percentage of the green light emitted from the liquid crystal panel 10, it is possible to increase the sharpness of an image displayed on the liquid crystal panel 10.

Note that the light separating plate 52 may not be designed to transmit 50% of incident light while reflecting 50% of the light. The transmittance and reflectance of the light separating plate 52 should preferably be set based on the luminance of light emitted from each of LEDs 53 disposed on the substrate 51.

When the transmittance and reflectance of the light separating plate 52 are set based on the luminance of light emitted from each of LEDs 53 disposed on the substrate 51, it is possible in the light sources 50 to reduce the unevenness in luminance and color of the incident light upon the diffusion plate 42, caused by the difference in luminance of the light emitted from the LEDs 53. That is, the light emitted from the entire main side of the diffusion plate 42 will be less uneven in luminance and color.

Figure 16:
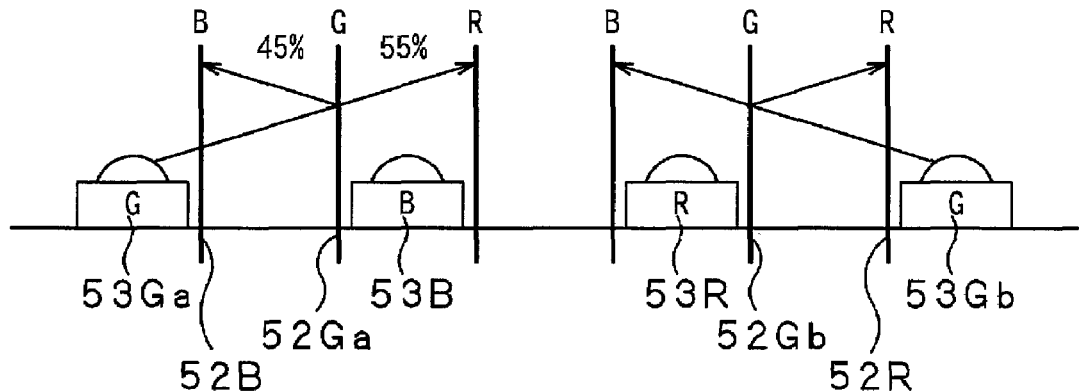
FIG. 16 explains an example in which the luminance evenness of light emitted from a diffusion plate is improved by controlling the transmittance and reflectance of the light by the light transmitting/reflecting plate.

For example, in case green light emitted from one (53Ga), adjacent to the blue LED 53B, of adjacent green LEDs 53Ga and 53Gb between which the blue and red LEDs 53B and 53R are laid has a luminance of 80 ("luminance" is expressed with a value relative to a mean value, taken as 100 herein, of the luminance of green light emitted from green LEDs 53G) and green light emitted from the other green LED 53Gb adjacent to the red LED 53R has a luminance has a luminance of 120, as shown in FIG. 16, the following will apply:

Blue and green light separating plates 52B and 52Ga are disposed between the green and blue LEDs 53Ga and 53B, and green and red light separating plates 52Gb and 52R are disposed between the red and green LEDs 53R and 53Gb. Namely, the two green light separating plates 52Ga and 52Gb are disposed between the green LEDs 53Ga and 53Gb.

In case both the green light separating plates 52Ga and 52Gb are designed to reflect 50% of incident green light while transmitting 50% of the green light, the luminance of the transmitted light and percentage of the green light are lower in the traveling direction of light emitted from the green LED 53Ga. Also, the luminance of the transmitted light and percentage of the green light are higher in the traveling direction of the light emitted from the green LED 53Gb. Therefore, light incident upon the diffusion plate 42 will be uneven in luminance and color.

On the other hand, on the assumption that the transmittance and reflectance of the green light separating plate 52Gb are 55% and 45%, respectively, many of the green light emitted from the green LED 53Gb travel toward the position of the green LED 53Ga as shown in FIG. 16. Therefore, there is a smaller difference in luminance and percentage of the green light between the light passing in the traveling direction of the green light emitted from the green LED 53Ga and light passing in the traveling direction of the green light emitted from the green LED 53Gb.

That is, since a transmittance and reflectance of the light separating plate 52 are set based on the luminance of light emitted from each LED 53 disposed on the substrate 51, the unevenness in luminance and color of the light incident upon the diffusion plate 42 are reduced so that the light emitted from the entire main side of the diffusion plate 42 will be less uneven in luminance and color.

Figure 17:
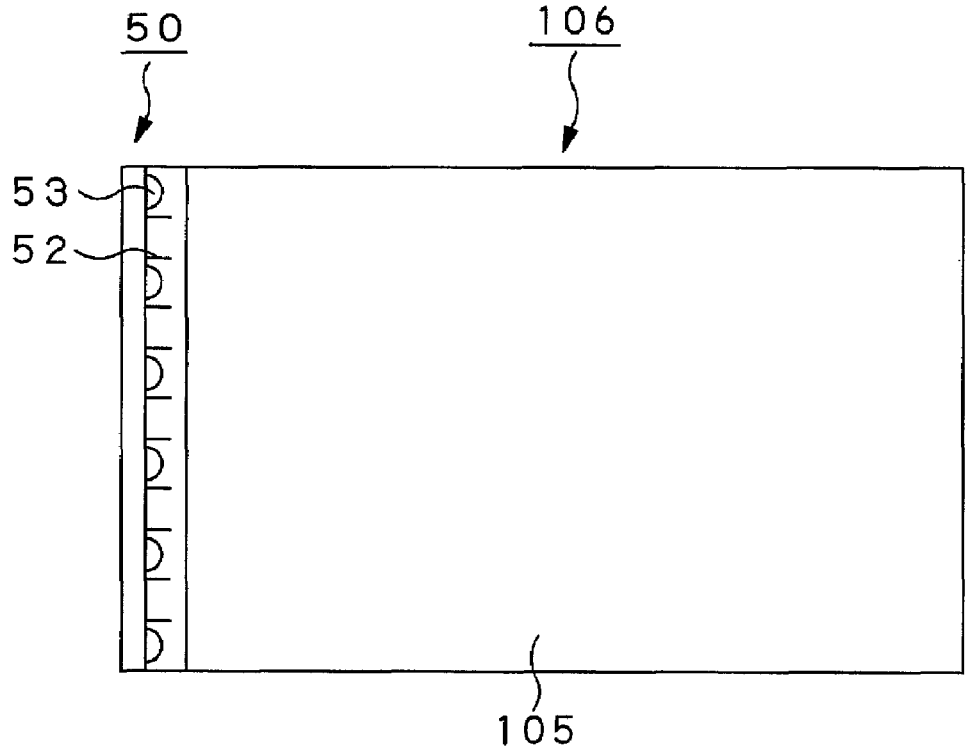
FIG. 17 is a plan view of a side edge-type backlight device.

Note that the liquid crystal display device 1 may use, in place of the aforementioned backlight device 20, a waveguide type backlight device 106 having the light source 50 provided on the lateral side of an optical waveguide 105 as shown in FIG. 17. Use of the light source 50 allows reducing the necessary number of LEDs 53 used in the waveguide type backlight device 106.

SECOND EMBODIMENT

Note that the backlight device 20 may include a light source 110 as shown in FIGS. 18A and 18B in place of the aforementioned light source 50. The light source 110 included in the backlight device 20 will be described below as a second embodiment of the present invention. It should be noted that in the following explanation, the members equivalent to those in the light source 50 will not be described any more and will be indicated with the same reference numerals as those for the light source 50.

In the light source 110, red, green and blue light separating plates 52R, 52G and 52B, and red, green and blue LEDs 53R, 53G and 53B are disposed and virtual images 53R', 53G' and 53B' of the red, green and blue LEDs 53R, 53G and 53B, respectively, formed by the red, green and blue light separating plates 52R, 52G and 52B, respectively, are positioned as will be explained below.

The light source 110 has disposed on the substrate 51 thereof red, green and blue light separating plates 52R, 52G and 52B and red, green and blue LEDs 53R, 53G and 53B as shown in FIGS. 18A and 18B. Also, the number of green light separating plates 52G disposed on the substrate 51 is double those of the red and blue light separating plates 52R and 52B, and the number of the green LEDs 53G is double those of the red and blue LEDs 53R and 53B.

The red light separating plates 52R are disposed alternately with a pitch of 3 w and pitch of 5 w. More specifically, a half in number of the red light separating plates 52R (second red light separating plates 52R-2) are disposed with a pitch of 8 w on the substrate 51, while the rest (first red light separating plates 52R-1) are disposed with a pitch of 8 w in positions 3 w apart from the second red light separating plates 52R-2 in the direction of the second end E2 on the substrate 51.

Also, the blue light separating plates 52B are disposed on the substrate 51 in positions 4 w apart from the red light separating plates 52R in the direction of the second end E2. More specifically, the blue light separating plates 52B are disposed with a pitch of 3 w and pitch of 5 w repeated alternately in positions 4 w apart from the red light separating plates 52R in the direction of the second end E2.

Also, the green light separating plates 52G are disposed one in each position w apart from each red light separating plate 52R in an area between the two red light separating plates 52R adjacent to each other and 3 w apart from each other, and one in each position w apart from each blue light separating plate 52B in an area between the two blue light separating plates 52B adjacent to each other and 3 w apart from each other.

More specifically, the red, green and blue light separating plates 52R, 52G and 52B are disposed with a pitch of w on the substrate 51 repeatedly to form an array of the red, green, green, red, blue, green, green and blue light separating plates 52R, 52G, 52G, 52R, 52B, 52G, 52G and 52B counted from the first end E1.

Figure 19:
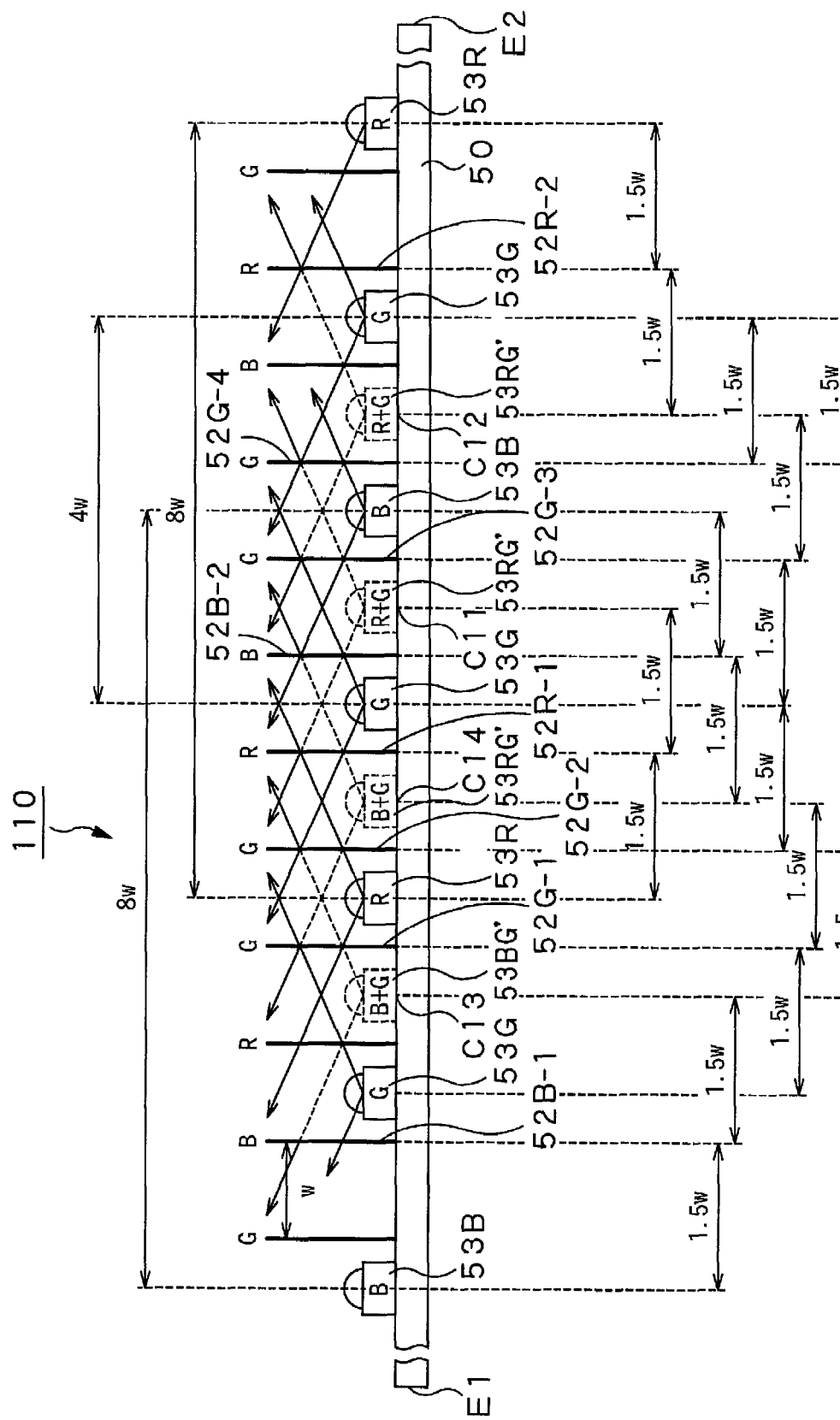
FIG. 19 explains an example disposition of LEDs and light separating plates included in the light source, and position of a virtual image formed by the light separating plates.

As shown in FIG. 19, the red LEDs 53R are disposed one at each center between two green light separating plates 52G disposed between two red light separating plates 52R disposed in positions 3 w apart from each other. That is, the red LEDs 53R are disposed alternately with a pitch of 8 w one at every other center between two adjacent red light separating plates 52R.

The blue LEDs 53B are disposed one at each center between two green light separating plates 52G disposed between two blue light separating plates 52B disposed in positions 3 w apart from each other. This disposition is repeated. That is, the blue LEDs 53B are alternately disposed with a pitch of 8 w one at every other center between two adjacent blue light separating plates 52B.

The green LEDs 53G are disposed one at each center between a first red light separating plate 52R-1 and second blue light separating plate 52B-2 and one at each center between a second red light separating plate 52R-2 and first blue light separating plate 52B-1. That is, the green LEDs 53G are disposed alternately with a pitch of 4 w between the two adjacent green light separating plates 52G.

Since the light separating plates 52 and LEDs 53 are disposed as above, a red LED 53R is disposed in a position 1.5 w apart from one, disposed at the side of the first end E1, of the red light separating plates 52R (will be referred to as "a pair of red light separating plates" hereunder wherever they should generically be referred to) disposed in positions 5 w apart from each other at the side of the first end E1 as shown in FIG. 19. Also, a red LED 53R is disposed in a position 1.5 w apart from the red light separating plate 52R disposed at the second end E2.

In the following explanation, one, disposed at the side of the first end E1, of the pair of red light separating plates 52R will be referred to as "first red light separating plate 52R-1" hereunder, while the other red light separating plate 52R disposed at the side of the second end E2 will be referred to as "second red light separating plate 52R-2" hereunder, wherever it is necessary to distinguish them from each other.

The first red light separating plate 52R-1 transmits 50% of light emitted from the red LED 53R disposed in a position 1.5 w apart therefrom in the direction of the first end E1 while reflecting 50% of the light. Extended in a direction opposite to the traveling direction of the red light having been reflected by the first red light separating plate 52R-1, the light path of the red light will intersect with a position in a position 1.5 w apart from the first red light separating plate 52R-1 in the direction of the second end E2.

That is, a position C11 at the center between the blue light separating plate 52B disposed in a position w apart from the first red light separating plate 52R-1 in the direction of the second end E2 and green light separating plate 52G disposed in a position 2 w apart from the first red light separating plate 52R-1 and in which no LED 53 is disposed is an apparent source of the red light having been reflected by the first red light separating plate 52R-1.

Also, the second red light separating plate 52R-2 transmits 50% of light emitted from the red LED 53R disposed in a position 1.5 w apart therefrom in the direction of the second end E2 while reflecting 50% of the light. Extended in a direction opposite to the traveling direction of the red light having been reflected by the second red light separating plate 52R-2, the light path of the red light will intersect with a position in a position 1.5 w apart from the second red light separating plate 52R-2 in the direction of the first end E1.

That is, a position C12 at the center between the blue light separating plate 52B disposed in a position w apart from the second red light separating plate 52R-2 in the direction of the first end E1 and green light separating plate 52G disposed in a position 2 w apart from the second red light separating plate 52R-2 and in which no LED 53 is disposed is an apparent source of the red light having been reflected by the second red light separating plate 52R-2.

Also, one, disposed at the side of the first end E1, of the two blue light separating plates 52B (will be referred to as "a pair of blue light separating plates" hereunder wherever they should generically be referred to) disposed in positions 5 w apart from each other has a blue LED 53R disposed in a position 1.5 w apart therefrom the in the direction of the first end E1. Also, a blue LED 53B is disposed in a position 1.5 w apart in the direction of the second end E2 from the other blue light separating plate 52B disposed at the side of the second end E2.

In the following explanation, one, disposed at the side of the first end E1, of the pair of blue light separating plates 52B will be referred to as "first blue light separating plate 52B-1" hereunder, while the other blue light separating plate 52B disposed at the side of the second end E2 will be referred to as "second blue light separating plate 52B-2" hereunder, wherever it is necessary to distinguish them from each other.

The first blue light separating plate 52B-1 transmits 50% of light emitted from the blue LED 53B disposed in a position 1.5 w apart therefrom in the direction of the first end E1 while reflecting 50% of the light. Extended in a direction opposite to the traveling direction of the blue light having been reflected by the first blue light separating plate 52B-1, the light path of the blue light will intersect with a position in a position 1.5 w apart from the first blue light separating plate 52B-1 in the direction of the second end E2.

That is, a position C13 at the center between the red light separating plate 52R disposed in a position w apart from the first blue light separating plate 52B-1 in the direction of the second end E2 and green light separating plate 52G disposed in a position 2 w apart from the first blue light separating plate 52B-1 and in which no LED 53 is disposed is an apparent source of the red light having been reflected by the first red light separating plate 52R-1.

The second blue light separating plate 52B-2 transmits 50% of light emitted from the blue LED 53B disposed in a position 1.5 w apart therefrom in the direction of the second end E2 while reflecting 50% of the light. Extended in a direction opposite to the traveling direction of the blue light having been reflected by the second blue light separating plate 52B-2, the light path of the blue light will intersect with a position in a position 1.5 w apart from the second blue light separating plate 52B-2 in the direction of the first end E1.

That is, a position C14 at the center between the red light separating plate 52R disposed in a position w apart from the second blue light separating plate 52B-2 in the direction of the first end E1 and green light separating plate 52G disposed in a position 2 w apart from the second blue light separating plate 52B-2 and in which no LED 53 is disposed is an apparent source of the blue light having been reflected by the second blue light separating plate 52B-2.

Also, one, disposed at the side of the first end E1, of the two green light separating plates 52G disposed between two red light separating plates 52R disposed in positions 3 w apart from each other has a green LED 53G disposed in a position 1.5 w therefrom in the direction of the first end E1, and a green LED 53G is disposed in a position 1.5 w apart in the direction of the second end E2 from the other green light separating plate 52G disposed at the side of the second end E2.

Also, one, disposed at the side of the first end E1, of the two green light separating plates 52G disposed between two blue light separating plates 52B disposed in positions 3 w apart from each other has a green LED 53G disposed in a position 1.5 w apart therefrom in the direction of the first end E1 from, and a green LED 53G is disposed in a position 1.5 w apart in the direction of the second end E2 from the green light separating plate 52G disposed at the side of the second end E2.

In the following explanation, one, disposed at the side of the first end E1, of the pair of green light separating plates 52G disposed between two red light separating plates 52R disposed in positions 3 w apart from each other, will be referred to as "first green light separating plate 52G-1" hereunder, while the second green light separating plate 52G disposed at the side of the second end E2 will be referred to as "second blue light separating plate 52G-2" hereunder, wherever it is necessary to distinguish them from each other. One, disposed at the side of the first end E1, of two green light separating plates 52G disposed between two blue light separating plates 52B disposed in positions 3 w apart from each other, will be referred to as "third green light separating plate 52G-3" hereunder, while the other disposed at the side of the second end E2 will be referred to as "fourth green light separating plate 52G-4" hereunder.

The first green light separating plate 52G-1 transmits 50% of light emitted from the green LED 53G disposed in a position 1.5 w apart therefrom in the direction of the first end E1 while reflecting 50% of the light. Extended in a direction opposite to the traveling direction of the green light having been reflected by the first green light separating plate 52G-1, the light path of the green light will intersect with a position in a position 1.5 w apart from the first green light separating plate 52G-1 in the direction of the second end E2.

That is, a position C14 at the center between the second green light separating plate 52G-2 disposed in a position w apart from the first green light separating plate 52G-1 in the direction of the second end E2 and first red light separating plate 52R-1 disposed in a position 2 w apart from the first green light separating plate 52G-1 and in which no LED 53 is disposed is an apparent source of the green light having been reflected by the first green light separating plate 52G-1.

Therefore, the apparent source of the green light having been reflected by the first green light separating plate 52G-1 is the same as that of the blue light having been reflected by the first blue light separating plate 52B-1. More specifically, in the position C14 at the center between the second green light separating plate 52G-2 and first red light separating plate 52R-1 and in which no LED 53 is disposed, there is formed a virtual image 53BG' (will be referred to as "virtual image of the blue/green LED" hereunder) of the LED 53 which is the apparent source of the blue light having been reflected by the first blue light reflecting plate 52B-1 and also the apparent source of the green light having been reflected by the first green light separating plate 52G-1. The virtual image 53BG' of the blue/green LED emits, in an apparent manner, green light at the side of the green light separating plate 52G and blue light at the side of the red light separating plate 52R.

The second green light separating plate 52G-2 transmits 50% of light emitted from the green LED 53G disposed in a position 1.5 w therefrom in the direction of the second end E2 while reflecting 50% of the light. Extended in a direction opposite to the traveling direction of the green light having been reflected by the second green light separating plate 52G-2, the light path of the green light will intersect with a position in a position 1.5 w apart from the second green light separating plate 52G-2 in the direction of the first end E1.

That is, the position C13 at the center between the first green light separating plate 52G-1 disposed in a position w apart from the second green light separating plate 52G-2 in the direction of the first end E1 and second red light separating plate 52R-2 disposed in a position 2 w apart from the second green light separating plate 52G-2 and in which no LED 53 is disposed is an apparent source of the green light having been reflected by the second green light separating plate 52G-2.

Therefore, the apparent source of the green light having been reflected by the second green light separating plate 52G-2 is the same as that of the blue light having been reflected by the first blue light separating plate 52B-1. More specifically, in the position C13 at the center between the first green light separating plate 52G-1 and second red light separating plate 52R-2 and in which no LED 53 is disposed, there is formed a virtual image 53BG' of the blue/green LED 53 which is the apparent source of the blue light having been reflected by the first blue light reflecting plate 52B-1 and also the apparent source of the green light having been reflected by the second green light separating plate 52G-2.

The third green light separating plate 52G-3 transmits 50% of light emitted from the green LED 53G disposed in a position 1.5 w apart therefrom in the direction of the first end E1 while reflecting 50% of the light. Extended in a direction opposite to the traveling direction of the green light having been reflected by the third green light separating plate 52G-3, the light path of the green light will intersect with a position in a position 1.5 w apart from the third green light separating plate 52G-3 in the direction of the second end E2.

That is, the position C12 at the center between the fourth green light separating plate 52G-4 disposed in a position w apart from the third green light separating plate 52G-3 in the direction of the second end E2 and first blue light separating plate 52B-1 disposed in a position 2 w apart from the third green light separating plate 52G-3 and in which no LED 53 is disposed is an apparent source of the green light having been reflected by the third green light separating plate 52G-3.

Therefore, the apparent source of the green light having been reflected by the third green light separating plate 52G-3 is the same as that of the red light having been reflected by the second red light separating plate 52R-2. More specifically, in the position C12 at the center between the fourth green light separating plate 52G-4 and first blue light separating plate 52B-1 and in which no LED 53 is disposed, there is formed a virtual image 53RG' (will be referred to as "virtual image of the red/green LED" hereunder) of the LED 53 which is the apparent source of the red light having been reflected by the second red light reflecting plate 52R-2 and also the apparent source of the green light having been reflected by the third green light separating plate 52G-3. The virtual image 53RG' of the blue/green LED emits, in an apparent manner, green light at the side of the green light separating plate 52G and red light at the side of the blue light separating plate 52B.

The fourth green light separating plate 52G-4 transmits 50% of light emitted from the green LED 53G disposed in a position 1.5 w apart therefrom in the direction of the second end E2 while reflecting 50% of the light. Extended in a direction opposite to the traveling direction of the green light having been reflected by the fourth green light separating plate 52G-4, the light path of the green light will intersect with a position in a position 1.5 w apart from the fourth green light separating plate 52G-4 in the direction of the first end E1.

That is, the position C11 at the center between the third green light separating plate 52G-3 disposed in a position $\underline{w}$ apart from the fourth green light separating plate 52G-4 in the direction of the first end E1 and second blue light separating plate 52B-2 disposed in a position 2 w apart from the fourth green light separating plate 52G-4 and in which no LED 53 is disposed is an apparent source of the green light having been reflected by the fourth green light separating plate 52G-4.

Therefore, the apparent source of the green light having been reflected by the fourth green light separating plate 52G-4 is the same as that of the red light having been reflected by the first red light separating plate 52R-1. More specifically, in the position C11 at the center between the third green light separating plate 52G-3 and second blue light separating plate 52B-2 and in which no LED 53 is disposed, there is formed a virtual image 53RG' of the red/green LED 53 which is the apparent source of the red light having been reflected by the first red light reflecting plate 52R-1 and also the apparent source of the green light having been reflected by the fourth green light separating plate 52G-4.

Since the red LEDs 53R, green LEDs 53G and blue LEDs 53B and the red light separating plates 52R, green light separating plates 52G and blue light separating plates 52B are disposed as above, the light source 110 forms, in an area between the red and green LEDs 53R and 53G and where no LED 53 is disposed, the virtual image 53BG' of the blue/green LED which emits green light in the direction of the red LED 53R while emitting blue light in the direction of the green LED 53G, and in an area between the blue and green LEDs 53B and 53G and where no LED 53 is disposed, the virtual image 53RG' of the red/green LED which emits green light in the direction of the blue LED 53B while emitting red light in the direction of the green LED 53G.

That is, since the light source 110 forms the virtual image 53' of the LED 53 in a position between the LEDs 53 disposed on the substrate 51, it is possible to increase the number of the apparent LEDs 53 in use.

Also, the light source 110 forms, between the light paths of the green light, such a virtual image 53' that the light path of the red light and that of the blue light appear to be different from each other. Therefore, the backlight device 20 including the light source 110 can efficiently mix the red light, blue light and green light whose light intensity is nearly double that of each of the red light and blue light to produce white light that contributes to an improved sharpness of an image displayed on the liquid crystal panel 10.

THIRD EMBODIMENT

Also, the backlight device 20 may include a light source 120 as shown in FIGS. 20A and 20B in place of the aforementioned light sources 50 and 110. The light source 120 included in the backlight device 20 will be described below as a third embodiment of the present invention. It should be noted that in the following explanation, the members equivalent to those in the light source 50 will not be described any more and will be indicated with the same reference numerals as those for the light source 50.

As shown in FIGS. 20A and 20B, the light source 120 includes green light separating plates 52G and red/blue light separating plates 52RB, and red, green and blue LEDs 53R, 53G and 53B, disposed on the substrate 51.

The red/blue light separating plate 52RB transmits 50% of incident red and blue light while reflecting 50% of the light and transmits 100% of incident green light. By reflecting 50% of the incident red and blue light, the red/blue light separating plate 52RB forms virtual images 53R' and 53B' of the red and blue LEDs 53R and 53B, respectively, which are apparent sources of the reflected red and blue light, respectively.

More specifically, the virtual image 53R' of the red LED 53R is formed in a position opposite to the red LED 53R having emitted the red light incident upon the red/blue light separating plate 52RB with reference to the red/blue light separating plate 52RB. Also, the virtual image 53B' of the blue LED 53B is formed in a position opposite to the blue LED 53B having emitted the blue light incident upon the red/blue light separating plate 53RB with reference to the red/blue light separating plate 52RB.

The red/blue light separating plate 53RB may be, for example, a stack of the red and blue light separating plates 52R and 52B.

Next, there will be explained the disposition of the red/blue light separating plate 52RB and green light separating plate 52G and the red, green and blue LEDs 53R, 53G and 53B, and positions of the virtual images 53R' and 53B' of the red and blue LEDs 53R and 53B, respectively, formed by the red/blue light separating plate 52RB and the virtual image 53G' of the green LED 53G, formed by the green light separating plate 52G.

The green light separating plates 52G are disposed with a pitch of 4 w longitudinally of the substrate 51. Also, the red/blue light separating plates 52RB are disposed with a pitch of 4 w in a position $\underline{w}$ apart from each green light separating plate 52G longitudinally of the substrate 51.

The green LEDs 53G are disposed two at every other center between adjacent green light separating plates 52G. Two green LEDs 53G disposed at the center between the adjacent green light separating plates 52G are disposed at a predetermined interval along the main side of the green LED 53G. Also, one of the two green LEDs 53G disposed at the center between the adjacent green light separating plates 52G is disposed on a straight line (will be referred to as "first straight line" hereunder) L1 extending longitudinally of the substrate 51, while the other is disposed on a straight line (will be referred to as "second straight line" hereunder) L2 parallel to the first one L1. That is, the green LEDs 53G are disposed with a pitch of 4 w on the first and second straight lines L1 and L2.

Note that in the following explanation, the green LEDs 53G disposed on the first straight line L1 will be referred to as "first green LED 53G-1" hereunder and those disposed on the second straight line L2 will be referred to as "second green LED 53G-2" hereunder, wherever it is necessary to distinguish them from each other.

The red LEDs 53R are disposed one in every other position on the first straight line L1 and at the center between two adjacent red/blue light separating plates 52RB.

Also, the blue LEDs 53B are disposed one in every other position on the second straight line L2 parallel to the first one L1 and at the center between two adjacent red/blue light separating plates 52RB.

Note that since the red, green and blue LEDs 53R, 53G and 53B are disposed as above, the distance between the optical axes of the green and red LED 53G and 53R adjacent to each other with no light separating plate 52 laid between them and that between the optical axes of the green and blue LEDs 53G and 53B adjacent to each other with no light separating plate 52 laid between them are w.

Since the LEDs 53 and light separating plates 52 are disposed as above, one, disposed at the side of the first end E1 of the substrate 51, of the two green light separating plates 52G (will be referred to as "a pair of green light separating plates" hereunder wherever they should generically be referred to) disposed with a pitch of 4 w and having no LED 53 disposed between them on the first and second straight lines L1 and L2 is on the first and second straight lines L1 and L2, and a green LED 53G is disposed in a position 2 w apart from the green light separating plate 52G in the direction of the first end E1. Also, the other green light separating plate 52G disposed at the side of the second end E2 of the substrate 51 is disposed on the first and second straight lines, and a green LED 53G is disposed in a position 2 w apart from the green light separating plate 52G in the direction of the second end E2.

In the following explanation, one, disposed at the side of the first end E1, of the pair of green light separating plates 52G will be referred to as "first green light separating plate 52G-1" hereunder, and the other green light separating plate 52G disposed at the side of the second end E2 will be referred to as "second green light separating plate 52G-2" hereunder, wherever it is necessary to distinguish them from each other.

Figure 21A:
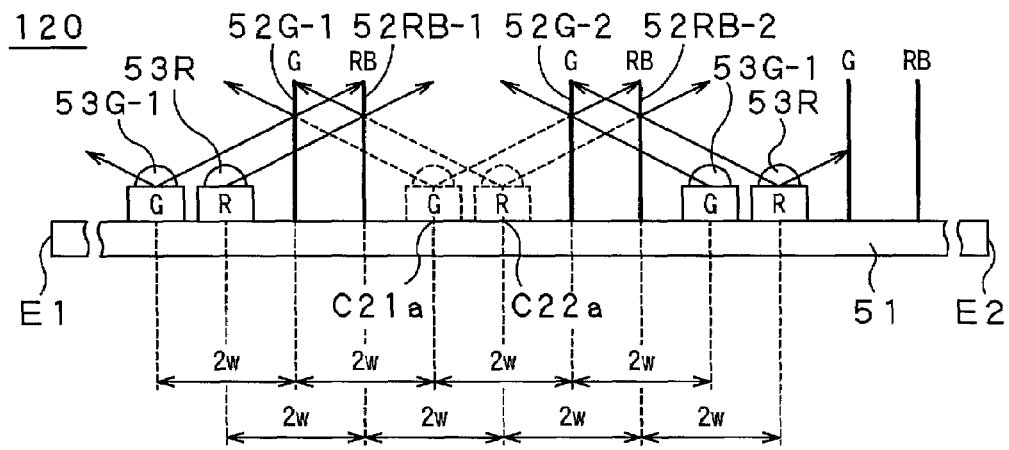
FIG. 21A is a sectional view, taken along the straight line L1 in FIGS. 20A and 20B, explaining an example disposition of LEDs and light separating plates included in the light source, and position of a virtual image formed by the light separating plate.
Figure 21B:
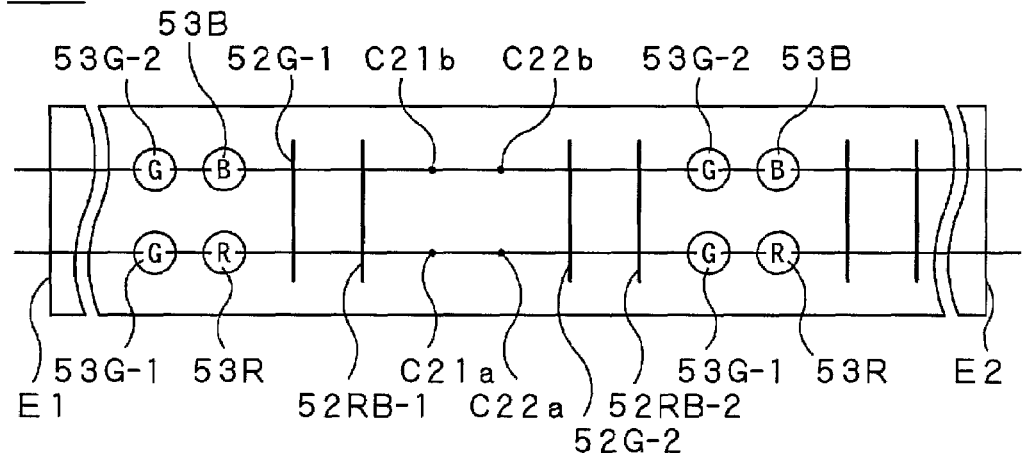
FIG. 21B is a plan view of the LEDs and light separating plates disposed as above.
Figure 21C:
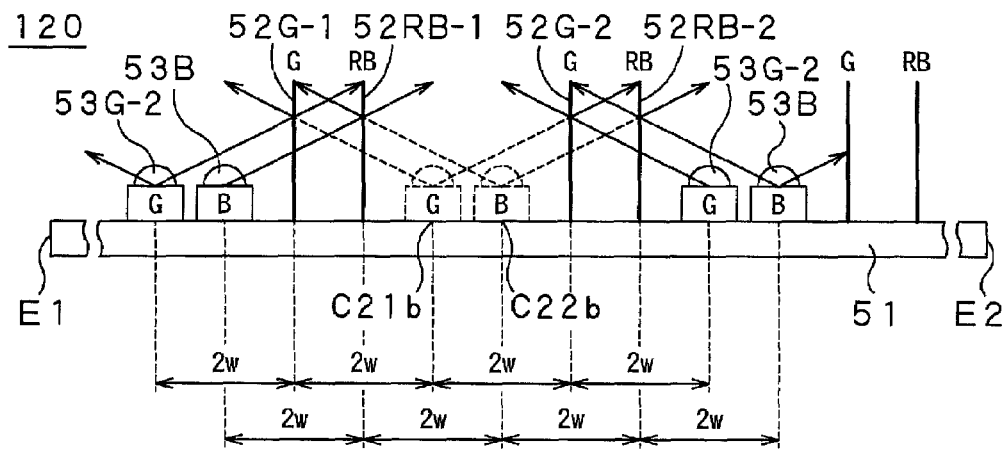
FIG. 21C is a sectional view, taken along the straight line L2 in FIGS. 20A and 20B, of LEDs and light separating plates.

As shown in FIGS. 21A, 21B and 21C, the first green light separating plate 52G-1 has the first and second green LEDs 53G-1 and 53G-2 disposed on the first and second straight lines L1 and L2 in positions 2 w apart from the first green light separating plate 52G-1 in the direction of the first end E1, but no green LED 53G is disposed in a position 2 w apart from the first green light separating plate 52G-1 in the direction of the second end E2.

The first green light separating plate 52G-1 transmits 50% of light emitted from the first and second green LEDs 53G-1 and 53G-2 disposed in positions 2 w apart from the first green light separating plate 52G-1 in the direction of the first end E1 while reflecting 50% of the light. As shown in FIG. 21A, extended in a direction opposite to the traveling direction of the green light having been emitted from the first green LED 53G-1 and then reflected by the first green light separating plate 52G-1, the light path of the green light will intersect with a position 2 w apart from first green light separating plate 52G-1 in the direction of the second end E2. More specifically, the light path of the green light will intersect with a position C21*a* on the first straight line L1 and at the center between the pair of the green light separating plates 52G as shown in FIG. 21B.

Also, as shown in FIG. 21C, extended in a direction opposite to the traveling direction of the green light having been emitted from the second green LED 53G-2 and then reflected by the first green light separating plate 52G-1, the light path of the green light will intersect with a position 2 w apart from the first green light separating plate 52G-1 in the direction of the second end E2. More specifically, the light path of the green light will intersect with a position C21*b* on the second straight line L2 and at the center between the pair of green light separating plates 52G as shown in FIG. 21B.

Note that FIG. 21A is a sectional view taken along the straight line L1 in FIGS. 20A and 20B and FIG. 21C is a sectional view taken along the straight line L2 in FIGS. 20A and 20B.

Therefore, the position C21*a* at the center between the pair of green light separating plates 52G, on the first straight line L1 and in which no LED 53 is disposed and the position C21*b* at the center between the pair of green light separating plates 52G, on the second straight line L2 and in which no LED 53 is disposed are apparent sources of the green light having been reflected by the first green light separating plate 52G-1.

The second green light separating plate 52G-2 transmits 50% of light emitted from the first and second green LEDs 53G-1 and 53G-2 disposed in positions 2 w apart from the second green light separating plate 52G-2 in the direction of the second end E2 while reflecting 50% of the light. As shown in FIG. 21A, extended in a direction opposite to the traveling direction of the green light having emitted from the first green LED 53G-1 and then reflected by the first green light separating plate 52G-1, the light path of the green light will intersect with a position 2 w from the second green light separating plate 52G-2 in the direction of the first end E1. More specifically, the light path of the green light will intersect with a position C21*a* on the first straight line L1 and at the center between the pair of the green light separating plates 52G as shown in FIG. 21B.

Also, as shown in FIG. 21C, extended in a direction opposite to the traveling direction of the green light having been emitted from the second green LED 53G-2 and then reflected by the first green light separating plate 52G-1, the light path of the green light will intersect with a position 2 w apart from the first green light separating plate 52G-1 in the direction of the first end E1. More specifically, the light path of the green light will intersect with a position C21*b* on the second straight line L2, at the center between the pair of green light separating plates 52G and in which no LED 53 is disposed as shown in FIG. 21B.

Therefore, the positions C21*a* and C21*b* at the center between the green light separating plates 52G, on the first and second straight lines L1 and L2 and in which no LED 53 is disposed will be apparent sources of the green light having been reflected by the second green light separating plate 52G-2.

As will be seen from the foregoing explanation, both the apparent source of green light having been reflected by the first green light separating plate 52G-1 and that of green light having been reflected by the second green light separating plate 52R-2 are in the positions C21*a* and C21*b* on the first and second straight lines L1 and L2, at the center between the pair of green light separating plates 52G and in which no LED 53 is disposed.

Therefore, in these positions C21*a* and C21*b* at the center between the green light separating plates 52G disposed with a pitch of 4 w, on the first and second straight lines L1 and L2 and in which no green LED 53G is disposed, there is formed the virtual image 53G' of the green LED 53G which is the apparent source of the green light having been reflected by the two green light separating plates 52G in a position 2 w apart from the positions C21*a* and C21*b*.

Also, red and blue LEDs 53R and 53B are disposed in a position 1.5 w in the direction of the first end E1 from one, disposed at the side of the first end E1 of the substrate 51, of he two red/blue light separating plates 52RB (will be referred to as "a pair of red/blue light separating plates 52RB" hereunder wherever they should generically be referred to) disposed with a pitch of 4 w and having no LED 53 disposed between them. Also, red and blue LEDs 53R and 53B are disposed in a position 1.5 w in the direction of the second end E2 from the other red/blue light separating plate 52RB disposed at the side of the second end E2 of the substrate 51.

In the following explanation, one, disposed at the side of the first end E1, of the pair of red/blue light separating plates 52RB will be referred to as "first red/blue light separating plate 52RB-1" hereunder, and the other red/blue light separating plate 52RB disposed at the side of the second end E2 will be referred to as "second red/blue light separating plate 52RB-2" hereunder, wherever it is necessary to distinguish them from each other, as shown in FIG. 21.

The first red/blue light separating plate 52RB-1 transmits 50% of light emitted from the red and blue LEDs 53R and 53B disposed in positions 2 w apart from the first red/blue light separating plate 52RB-1 in the direction of the first end E1 while reflecting 50% of the light. Extended in a direction opposite to the traveling direction of the red light having emitted from the red LED 53R and then reflected by the first red/blue light separating plate 52RB-1, the light path of the red light will intersect with a position 2 w apart from the first red/blue light separating plate 52RB-1 in the direction of the second end E2, as shown in FIG. 21A. More specifically, the light path of the red light will intersect with a position C22$a$ on the first straight line L1, at the center between the pair of the red/blue light separating plates 52RB and in which no LED 53R is disposed, as shown in FIG. 21B.

Also, as shown in FIG. 21C, extended in a direction opposite to the traveling direction of the blue light having been emitted from the blue LED 53B and then reflected by the first red/blue light separating plate 52RB-1, the light path of the blue light will intersect with a position 2 w apart from the first red/blue light separating plate 52RB-1 in the direction of the second end E2. More specifically, the light path of the blue light will intersect with a position C22$b$ on the second straight line L2, at the center between the pair of red/blue light separating plates 52RB and in which no LED 53 is disposed, as shown in FIG. 21B.

Therefore, the position C22$a$ on the first straight line L1, at the center between the pair of red/blue light separating plates 52RB and in which no LED 53 is disposed is an apparent source of the red light having been reflected by the first red/blue light separating plate 52RB-1. Also, the position C22$b$ on the second straight line L2, at the center between the pair of red/blue light separating plates 52RB and in which no LED 53 is disposed is an apparent source of the blue light having been reflected by the first red/blue light separating plate 52RB-1.

The second red/blue light separating plate 52RB-1 transmits 50% of light emitted from the red and blue LEDs 53R and 53B disposed in positions 2 w apart from the second red/blue light separating plate 52RB-1 in the direction of the second end E2 while reflecting 50% of the light. As shown in FIG. 21A, extended in a direction opposite to the traveling direction of the red light having emitted from the red LED 53R and then reflected by the first red/blue light separating plate 52RB-1, the light path of the red light will intersect with a position in a position 2 w apart from the first red/blue light separating plate 52RB-1 in the direction of the first end E1 as shown in FIG. 21A. More specifically, the light path of the red light will intersect with the position C22$a$ on the first straight line L1 and at the center between the pair of the red/blue light separating plates 52RB and in which no LED 53R is disposed, as shown in FIG. 21B.

Also, as shown in FIG. 21C, extended in a direction opposite to the traveling direction of the blue light having been emitted from the blue LED 53B and then reflected by the first red/blue light separating plate 52RB-1, the light path of the blue light will intersect with a position in a position 2 w apart from the first red/blue light separating plate 52RB-1 in the direction of the first end E1. More specifically, the light path of the blue light will intersect with the position C22$b$ on the second straight line L2, at the center between the pair of red/blue light separating plates 52RB and in which no LED 53 is disposed, as shown in FIG. 21B.

Therefore, the position C22$a$ on the first straight line L1, at the center between the pair of red/blue light separating plates 52RB and in which no LED 53 is disposed is an apparent source of the red light having been reflected by the second red/blue light separating plate 52RB-2. Also, the position C22$b$ on the second straight line L2, at the center between the pair of red/blue light separating plates 52RB and in which no LED 53 is disposed is an apparent source of the blue light having been reflected by the second red/blue light separating plate 52RB-2.

As will be seen from the foregoing explanation, both the apparent source of red light having been reflected by the first red/blue light separating plate 52RB-1 and that of red light having been reflected by the second red/blue light separating plate 52RB-2 are the position C22$a$ on the first straight line L1 and at the center between the pair of red/blue light separating plates 52RB.

Also, both the apparent source of blue light having been reflected by the first red/blue light separating plate 52RB-1 and that of blue light having been reflected by the second red/blue light separating plate 52RB-2 are the position C22$b$ on the second straight line L2 and at the center between the pair of red/blue light separating plates 52RB.

Therefore, in the position C22$a$ at the center between the red/blue light separating plates 52RB disposed with a pitch of 4 w, on the first straight line L1 and in which no blue LED 53 is disposed, there is formed the virtual image 53R' of the red LED 53R which is the apparent source of the red light having been reflected by the two red/blue light separating plates 52RB in a position 2 w apart from the position C22$a$.

Also, in the position C22$b$ at the center between the red/blue light separating plates 52RB disposed with a pitch of 4 w, on the second straight line L2 and in which no blue LED 53 is disposed, there is formed the virtual image 53B' of the blue LED 53B which is the apparent source of the blue light having been reflected by the two red/blue light separating plates 52RB in a position 2 w apart from the position C22$b$.

Since the red, green, blue and green LEDs 53R, 53G, 53B and 53G and the green and red light separating plates 52G and 52R are disposed as above, the light source 120 forms the virtual images 53R' and 53G' of the red and green LEDs 53R and 53G, respectively, in an area between the red and green LEDs 53R and 53G, and the virtual image 53B' and 53G' of the blue and green LEDs 53B 53G, respectively, in an area between the blue and green LEDs 53B and 53G.

That is, since the light source 120 forms the virtual image 53' of the LED 53 in a position between the LEDs 53 disposed on the substrate 51, it is possible to increase the number of the apparent LEDs 53 in use.

Also, the light source 120 forms such a virtual image 53R' that the array in which the red and green LEDs 53R and 53G are alternately disposed and the array in which the blue and green LEDs 53B and 53G are alternately disposed appear to be alternately disposed. Therefore, the backlight device 20 including the light source 120 can efficiently mix the red light, blue light and green light whose light intensity is nearly double that of each of the red light and blue light to produce white light that contributes to an improved sharpness of an image displayed on the liquid crystal panel 10.

FOURTH EMBODIMENT

Also, the backlight device 20 may include a light source 130 as shown in FIGS. 22A and 22B in place of the aforementioned light sources 50, 110 and 120. The light source 130 included in the backlight device 20 will be described below as a fourth embodiment of the present invention. It should be noted that in the following explanation, the members equivalent to those in the light source 50 will not be described any more and will be indicated with the same reference numerals as those for the light source 50.

As shown in FIGS. 22A and 22B, the light source 130 includes primary-colors light separating plates 52T, and red, green and blue LEDs 53R, 53G and 53B disposed on the substrate 51.

The primary-colors light separating plate 52T transmits 50% of incident red, blue and green light while reflecting 50% of the light. The primary-colors light separating plate 52T-1 reflects 50% of the incident red, green and blue light to form a virtual image 53R' which is an apparent source of the reflected light. More particularly, the primary-colors light separating plate 52T forms a virtual image 53R' of the red LED 53R in a position opposite to the red LED 53R having emitted the incident red light upon the primary-colors light separating plate 52T with reference to the primary-colors light separating plate 52T. Also, the primary-colors light separating plate 52T forms a virtual image 53G' of the green LED 53G in a position opposite to the green LED 53G having emitted the incident green light upon the primary-colors light separating plate 52T with reference to the primary-colors light separating plate 52T. Also, the primary-colors light separating plate 52T forms a virtual image 53B' of the blue LED 53B in a position opposite to the blue LED 53B having emitted the incident blue light upon the primary-colors light separating plate 52T with reference to the primary-colors light separating plate 52T.

Figure 23:
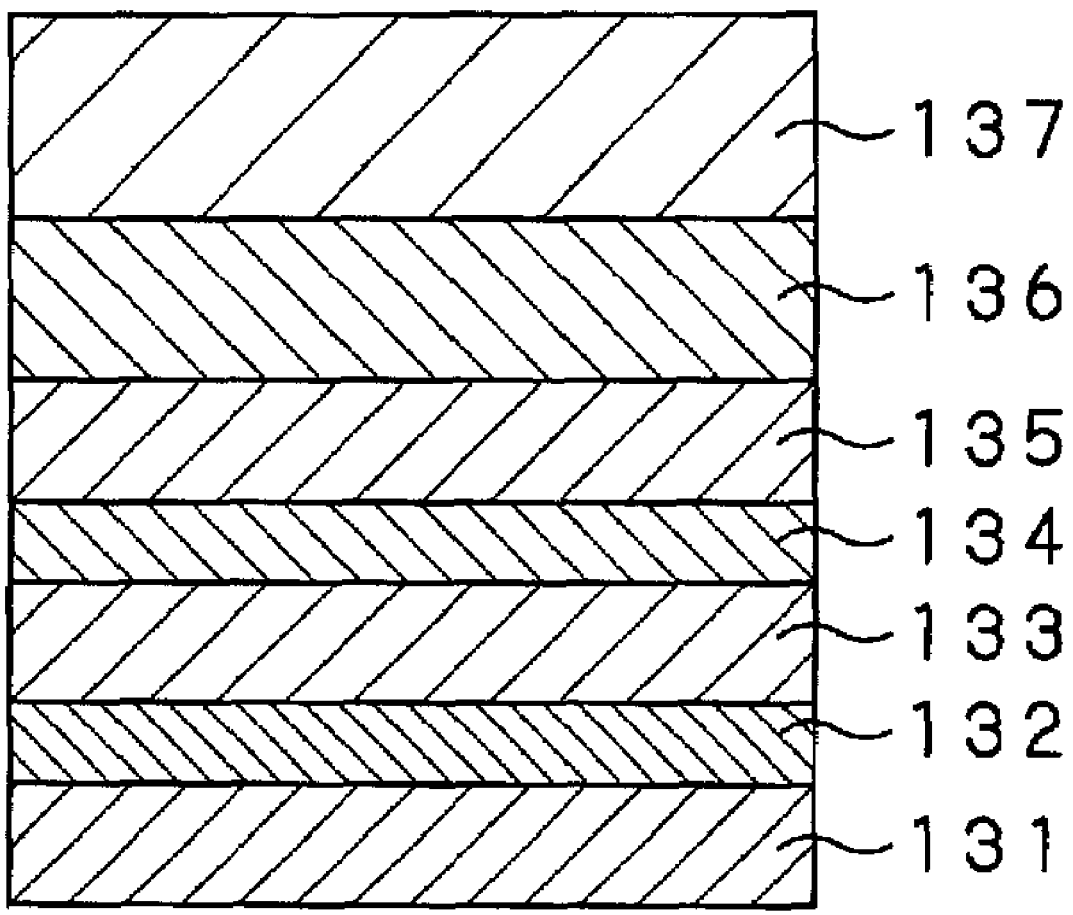
FIG. 23 is a sectional view of a primary-colors light separating plate used in the fourth embodiment of the present invention.

As shown in FIG. 23, the primary-colors light separating plate 52T includes, for example, a 44.45 nm-thick first $SiO_2$ layer 132, 85.72 nm-thick first $Nb_2O_5$ layer 133, 68.58 nm-thick second $SiO_2$ layer 134, 52.55 nm-thick second $Nb_2O_5$ layer 135, 95.67 nm-thick third $SiO_2$ layer 136 and a 133.39 nm-thick third $Nb_2O_5$ layer 137 stacked together in this order on the substrate 131.

Also, the primary-colors light separating plate 52T may be formed from a stack of red, green and blue light separating plates 52R, 52G and 52B, Also, according to the embodiment of the present invention, since the LED 53 is a standard side emitter, the primary-colors light separating plate 52T is designed to perform a desired optical function with light incident at an angle of 10 deg.

The primary-color light separating plates 52T are disposed with a pitch of 4 w longitudinally of the substrate 51.

In every other area between two primary-colors light separating plates 52T, the red LED 53R, green LED 53B and two blue LEDs 53B are disposed with a pitch of w in array longitudinally of the substrate 51, that is, in the direction in which the primary-colors light separating plates 52T are disposed. It should be noted that in the following explanation, a plurality of LEDs 53 disposed at the pitch of w in array between the primary-colors light separating plates 52T will be referred to as "LED array A1". Also, two primary-colors light separating plates 52T having no LED array A1 disposed between them will be referred to as "a pair of primary-colors light separating plates 52T" hereunder wherever they should generically be referred to.

Figure 24:
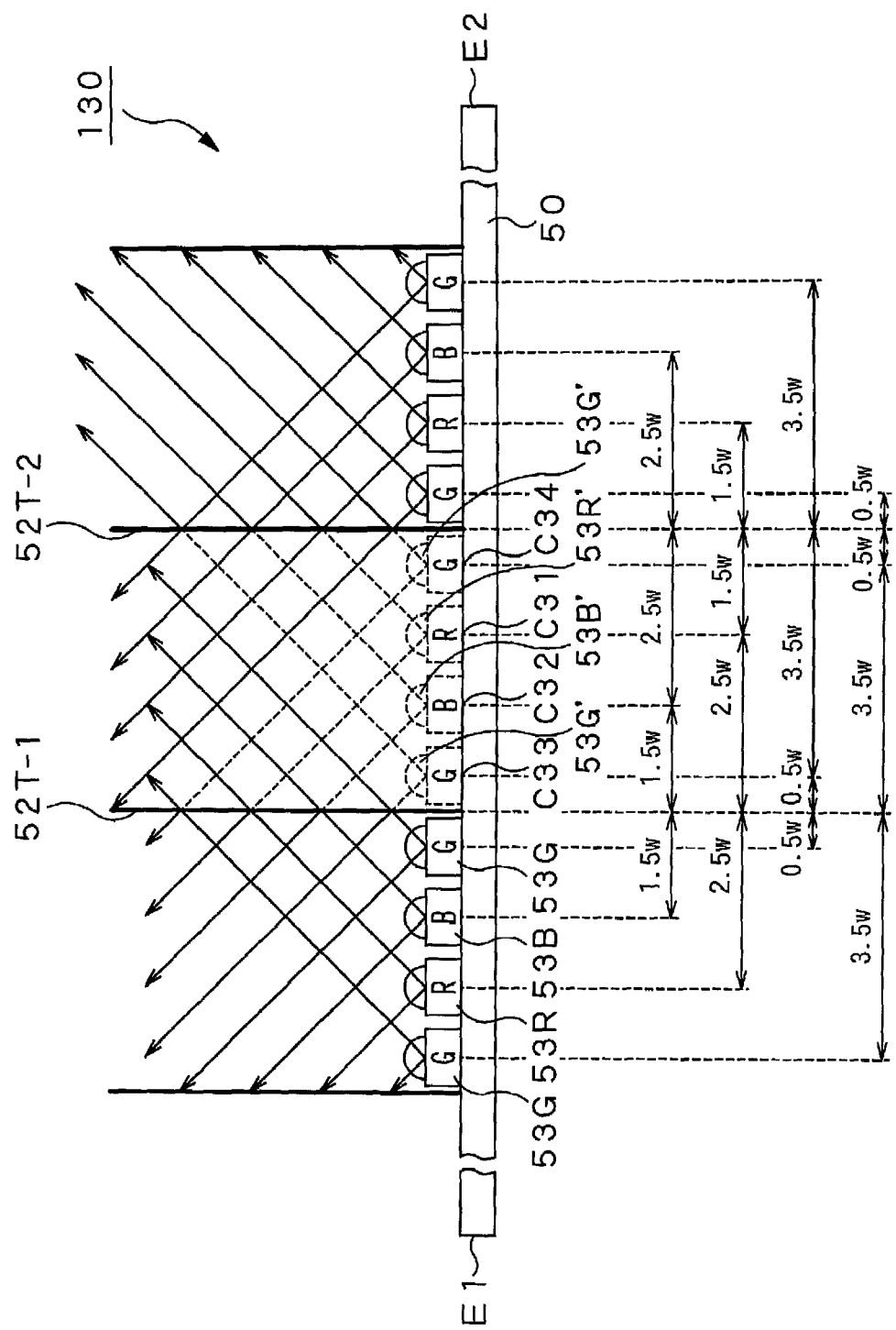
FIG. 24 is a side elevation showing an example disposition of LEDs and light separating plates included in the light source, and position of a virtual image formed by the light separating plates.

As shown in FIG. 24, the LED array A1 in the light source 130 includes four LEDs 53 disposed in array. The four LEDs 53 includes green, red, blue and green LEDs 53G, 53R, 53B and 53G disposed in this order from one end of the light source 130. Also, in the LED array A1, the green LEDs 53G at the opposite ends are disposed 0.5 w apart from the primary-colors light separating plates 52T, respectively.

Since the LED array A1 is disposed as above, one of the pair of primary-colors light separating plates 52T has an LED array A1 disposed at the side of the first end E1 of the substrate 51, while the other has an LED array A1 at the side of the second end E2 of the substrate 51.

In the following explanation, one of the pair of primary-colors light separating plates 52T, having the LED array A1 disposed at the side of the first end E1, will be referred to as "first primary-color light separating plate 52T-1" hereunder, and the other having the LED array A1 disposed at the side of the second end E2 will be referred to as "second primary-color light separating plate 52T-2" hereunder.

The first primary-colors light separating plate 52T-1 has a red LED 53R disposed in a position 2.5 w apart therefrom in the direction of the first end E1, a blue LED 53B disposed in a position 1.5 w apart therefrom in the direction of the first end E1 and green LEDs 53G disposed in positions 0.5 w and 3.5 w, respectively, apart therefrom in the direction of the first end E1.

The first primary-colors light separating plate 52T-1 transmits 50% of light emitted from the red LED 53R disposed in the direction of the first end E1 while reflecting 50% of the light. Extended in a direction opposite to the traveling direction of the red light having been reflected by the first primary-colors light separating plate 52T-1, the light path of the red light will intersect with a position C31 in a position 2.5 w apart from the first primary-colors light separating plate 52T-1 in the direction of the second end E2, namely, at the side of an area where no LED 53 is disposed. Therefore, the position C31 in the position 2.5 w apart from the first primary-colors light separating plate 52T-1 in the direction of the second end E2 is an apparent source of the red light having been reflected by the first primary-colors light separating plate 52T-1.

Also, the first primary-colors light separating plate 52T-1 transmits 50% of light emitted from the blue LED 53B disposed in the direction of the first end E1 while reflecting 50% of the light. Extended in a direction opposite to the traveling direction of the blue light having been reflected by the first primary-colors light separating plate 52T-1, the light path of the blue light will intersect with a position C32 which is 1.5 w apart from the first primary-colors light separating plate 52T-1 in the direction of the second end E2, that is, at the side of the area where no LED 53 is disposed. Therefore, the position C32 in the position 1.5 w apart from the first primary-colors light separating plate 52T-1 in the direction of the second end E2 is an apparent source of the blue light having been reflected by the first primary-colors light separating plate 52T-1.

Also, the first primary-colors light separating plate 52T-1 transmits 50% of light emitted from the green LED 53B disposed in the direction of the first end E1 while reflecting 50% of the light. Extended in a direction opposite to the traveling direction of the green light having been reflected by the first primary-colors light separating plate 52T-1, the light path of the green light will intersect with a position C33 in a position 0.5 w, and position C34 in a position 3.5 w, apart from the first primary-colors light separating plate 52T-1 in the direction of the second end E2, that is, at the side of the area where no LED 53 is disposed. Therefore, the position C33 in the position 0.5 w and position C34, which are 3.5 w apart from the first primary-colors light separating plate 52T-1 in the direction of the second end E2, are apparent sources of the green light having been reflected by the first primary-colors light separating plate 52T-1.

The second primary-colors light separating plate 52T-2 has a red LED 53R disposed in a position 1.5 w apart therefrom in the direction of the first end E1, a blue LED 53B disposed in a position 2.5 w apart therefrom in the direction of the first end E1 and green LEDs 53G disposed in positions 0.5 w and 3.5 w, respectively, apart therefrom in the direction of the first end E1.

The second primary-colors light separating plate 52T-2 transmits 50% of light emitted from the red LED 53R disposed in the direction of the second end E2 while reflecting 50% of the light. Extended in a direction opposite to the traveling direction of the red light having been reflected by the second primary-colors light separating plate 52T-2, the light path of the red light will intersect with a position 1.5 w apart from the second primary-colors light separating plate 52T-2 in the direction of the first end E1, that is, at the side of the area where no LED 53 is disposed.

The position 1.5 w apart from the second primary-colors light separating plate 52T-2 in the direction of the first end E1 coincides with the position C31 in a position 2.5 w apart from the first primary-colors light separating plate 52T-1 in the direction of the second end E2. Therefore, the position C31 which is 2.5 w apart from the first primary-colors light separating plate 52T-1 in the direction of the second end E2 is an apparent source of the red light having been reflected by the second primary-colors light separating plate 52T-2.

The second primary-colors light separating plate 52T-2 transmits 50% of light emitted from the blue LED 53B disposed in the direction of the second end E2 while reflecting 50% of the light. Extended in a direction opposite to the traveling direction of the blue light having been reflected by the second primary-colors light separating plate 52T-2, the light path of the blue light will intersect with a position 2.5 w apart from the second primary-colors light separating plate 52T-2 in the direction of the first end E1, that is, at the side of the area where no LED 53 is disposed.

The position 2.5 w apart from the second primary-colors light separating plate 52T-2 in the direction of the first end E1 coincides with the position C32 which is 1.5 w apart from the first primary-colors light separating plate 52T-1 in the direction of the second end E2. Therefore, the position C32 which is 1.5 w apart from the first primary-colors light separating plate 52T-1 in the direction of the second end E2 is an apparent source of the blue light having been reflected by the second primary-colors light separating plate 52T-2.

Also, the second primary-colors light separating plate 52T-2 transmits 50% of light emitted from the green LED 53G disposed in the direction of the second end E2 while reflecting 50% of the light. Extended in a direction opposite to the traveling direction of the green light having been reflected by the second primary-colors light separating plate 52T-2, the light path of the green light will intersect with a position C34 which is 0.5 w, and position C33 which is position 3.5 w, respectively, apart from the second primary-colors light separating plate 52T-2 in the direction of the first end E1, that is, at the side of the area where no LED 53 is disposed.

The position 0.5 w apart from the second primary-colors light separating plate 52T-2 in the direction of the first end E1 coincides with the position C34 which is 3.5 w apart from the first primary-colors light separating plate 52T-1 in the direction of the second end E2. Also, the position 3.5 w apart from the second primary-colors light separating plate 52T-2 in the direction of the first end E1 coincides with the position C33 which is 0.5 w apart from the first primary-colors light separating plate 52T-1 in the direction of the second end E2. Therefore, the position C33 which is 0.5 w, and position C34 which is 3.5 w, apart from the first primary-colors light separating plate 52T-1 in the direction of the second end E2 will be apparent sources of the green light having been reflected by the first primary-colors light separating plate 52T-1.

As will be understood from the above explanation, both the apparent source of the red light having been reflected by the first primary-colors light separating plate 52T-1 and that of the red light having been reflected by the second primary-colors light separating plate 52T-2 are the position C31 which is 2.5 w apart from the first primary-colors light separating plate 52T-1 in the direction of the second end E2.

Also, both the apparent source of the blue light having been reflected by the first primary-colors light separating plate 52T-1 and that of the blue light having been reflected by the second primary-colors light separating plate 52T-2 are the position C32 which is 1.5 w apart from the first primary-colors light separating plate 52T-1 in the direction of the second end E2.

Also, both the apparent source of the green light having been reflected by the first primary-colors light separating plate 52T-1 and that of the green light having been reflected by the second primary-colors light separating plate 52T-2 are the position C33 which is 0.5 w, and position C34 which is 3.5 w, apart from the first primary-colors light separating plate 52T-1 in the direction of the second end E2.

Therefore, in an area between two primary-colors light separating plates 52T and where no LED 53 is disposed, there are formed a virtual image 53R' of the red LED 53R, virtual image 53G' of the green LED 53G and virtual image 53B' of the blue LED 53B which are the sources of the red, green and blue light, respectively, having been reflected by the primary-colors light separating plates 52T disposed on either side of the area.

The virtual images 53R' and 53B' of the red and blue LEDs 53R and 53B, respectively, are formed in a position C31 which is 1.5 w apart from the first primary-colors light separating plate 52T-in the direction of the second end E2 and position C32 which is 1.5 w apart from the first primary-colors light separating plate 52T-1 in the direction of the second end E2. Also, the virtual image 53G' of the green LED 53G is formed in the positions C33 and C34, which are 0.5 w and 3.5 w, respectively, apart from the first primary-colors light separating plate 52T-1 in the direction of the second end E2.

Since the red, green and blue LEDs 53R, 53G and 53B and primary-colors light separating plates 52T are disposed as above, the light source 130 forms the virtual image 53R' of the red LED 53R, virtual images 53G' of the two green LEDs 53G and virtual image 53B' of the blue LED 53B, each in an area between two primary-colors light separating plates 52T and where no LED 53 is disposed.

That is, since a virtual image 53' of the LED 53 is formed between the LED arrays A1 disposed on the substrate 51, it is possible to increase the number of apparent LEDs 53 disposed in the light source 130.

Also, the light source 130 forms such a virtual image 53R' that four LEDs 53 including the green, red, blue and green LEDs 53G, 53R, 53B and 53G appear to be disposed in this order in an LED array A1. Therefore, the backlight device 20 including the light source 130 can efficiently mix the red light, blue light and green light whose light intensity is about double that of each of the red light and blue light to produce white light that contributes to an improved sharpness of an image displayed on the liquid crystal panel 10.

Figure 25:
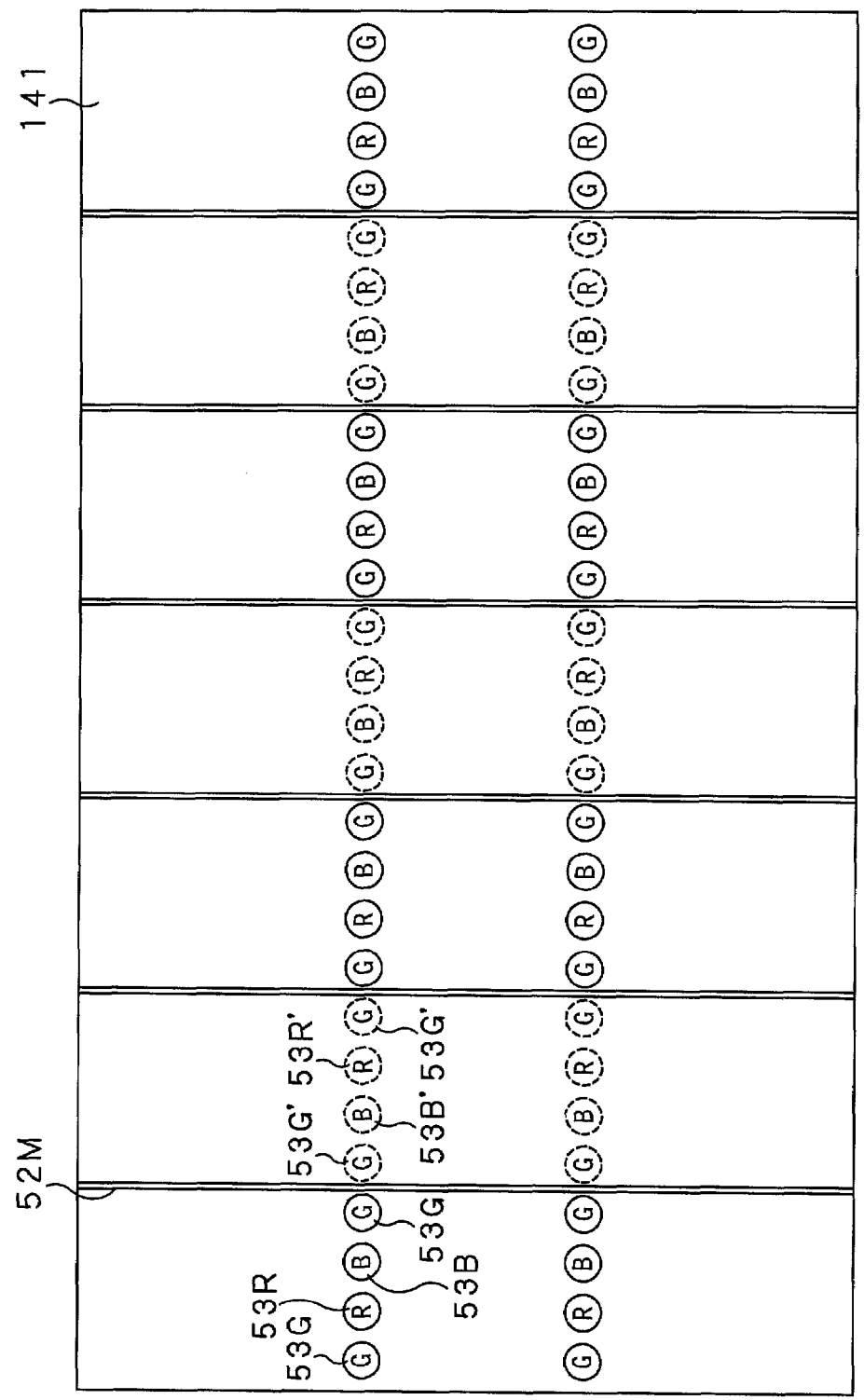
FIG. 25 is a plan view explaining another example disposition of LEDs in the light source.

Note that the substrate 51 may be a substrate 141 approximate in size to the bottom 40a of the housing 40 as shown in FIG. 25, the primary-colors light separating plate 52T be a primary-colors light separating plate 52M whose horizontal length is nearly equal to the width of the bottom 40a of the housing 40 and two or more LED arrays A1 may be disposed between the primary-colors light separating plates 52M.

Because of the above-mentioned design of the light source, the backlight device 20 may be formed from a reduced number of the light separating plates 52, and thus the number of parts used in the backlight device 20 may be reduced. Therefore, the backlight device 20 can be produced more easily.

FIFTH EMBODIMENT

Figure 26:
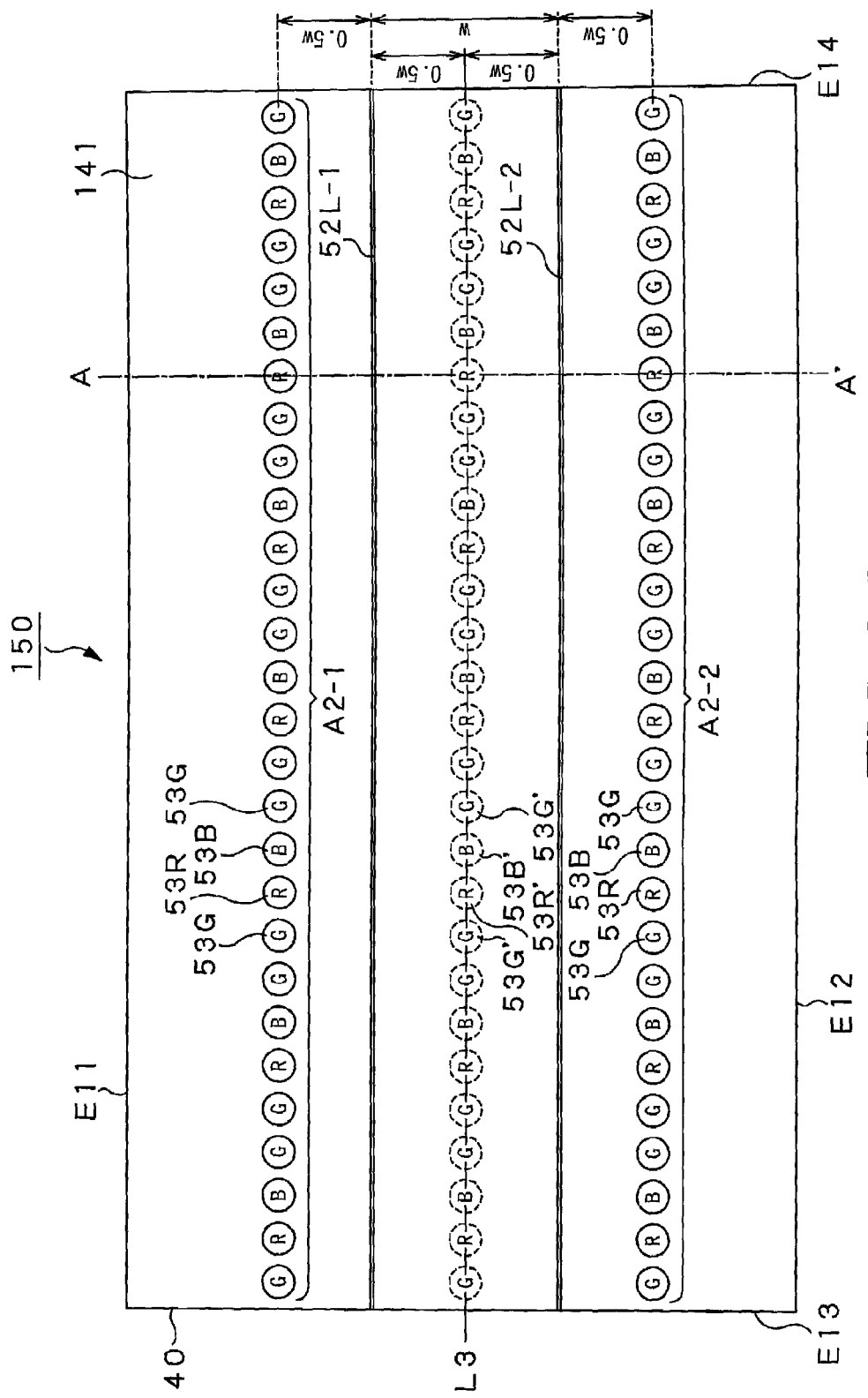
FIG. 26 is a plan view of a light source in a fifth embodiment of the present invention.

Also, the backlight device 20 may include a light source 150 as shown in FIG. 26 in place of the aforementioned light sources 50, 110, 120 and 130. The light source 150 included in the backlight device 20 will be described below as a fifth embodiment of the present invention. It should be noted that in the following explanation, the members equivalent to those in the light sources 50, 110, 120 and 130 will not be described any more and will be indicated with the same reference numerals as those for the light source 50, 110, 120 and 130.

As shown in FIG. 26, the light source 150 includes first and second primary-colors light separating plates 52L-1 and 52L-2 (will be referred to as "primary-colors light separating plate 52L" hereunder wherever it is not necessary to distinguish them from each other), and red, green and blue LEDs 53R, 53G and 53B disposed on the substrate 141.

The primary-colors light separating plate 52L has a horizontal length generally equal to the length of the substrate 141 and is disposed on the substrate 141 to extend horizontally longitudinally of the substrate 141. Also, the primary-colors light separating plates 52L are disposed with a pitch of $\underline{w}$.

Between each primary-colors light separating plate 52L and both width-directional ends E11 and E12 of the substrate 141, red, blue and green LEDs 53R, 53B and 53G are disposed in a position 0.5 w apart from each primary-colors light separating plate 52L in a predetermined order in array along the main side of the primary-colors light separating plate 52L. It should be noted that in the following explanation, the LEDs 53 disposed in array between the primary-colors light separating plates 52L and opposite ends E11 and E12 will be referred to as "LED array A2" hereunder. Also, one of the arrays A2, opposite to the first primary-colors light separating plate 52L-1, will be referred to as "first LED array A2-1" and the other opposite to the second primary-colors light separating plate 52L-2 will be referred to as "second LED array A2-2" hereunder, wherever it is not necessary to distinguish them from each other.

The two LED arrays A2 are disposed in array in a direction from one longitudinal end E13 of the substrate 141 toward the other end E14. More specifically, the red, green and blue LEDs 53R, 53G and 53B included in the first LED array A2-1 and the red, green and blue LEDs 53R, 53G and 53B included in the second LED array A2-2 are opposite to each other across the first and second primary-colors light separating plates 52L-1 and 52L-2.

Note that in the embodiment of the present invention, the two LED arrays A2 are disposed in array in such a manner that an array of green, red, blue and green LEDs 53G, 53R, 53B and 53G is repeated from the one end E13 toward the other end E13 along the length of the substrate 141.

Because of such a disposition of the LEDs 53, the first primary-colors light separating plate 52L-1 has the first LED array A2-1 disposed at the side of the one end E11, but no LED 53 disposed at the side of the other end E12 in the width direction of the substrate 141. Also, the second primary-colors light separating plate 52L-2 has the second LED array A2-2 disposed at the side of the other end E12 in the width direction of the substrate 141, but no LED 53 disposed at the side of the one end E11.

The first primary-colors light separating plate 52L-1 transmits 50% of the light emitted from each of the LEDs 53 included in the first LED array A2-1 while reflecting 50% of the light.

Figure 27:
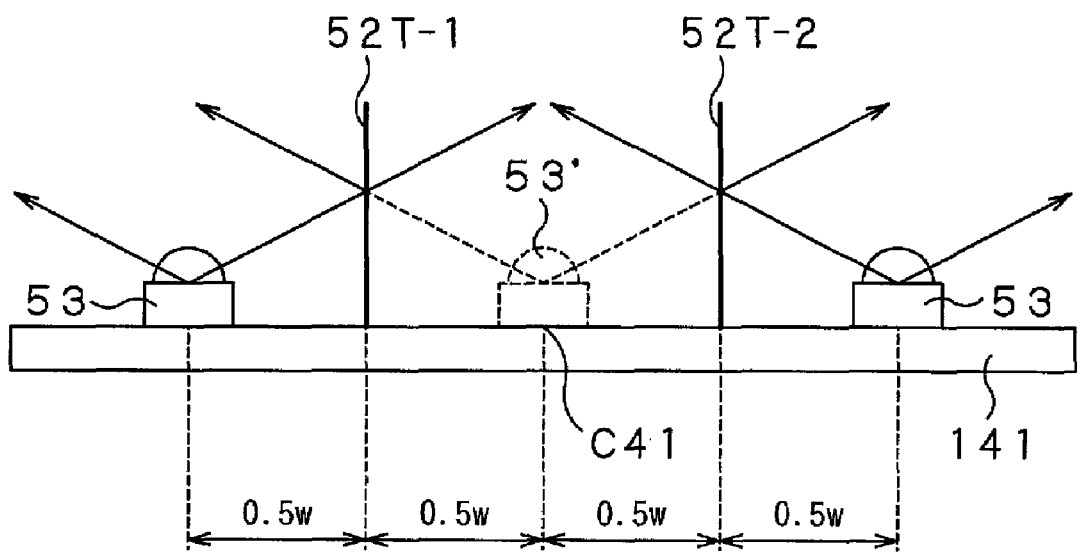
FIG. 27 is a side elevation showing an example disposition of LEDs and light separating plates included in the light source, and position of a virtual image formed by the light separating plates.

As shown in FIG. 27, extended in a direction opposite to the traveling direction of the light having been reflected by the first primary-colors light separating plate 52L-1, the light path of the light will intersect with a position about the first primary-colors light separating plate 52L-1 and opposite to each LED 53, in other words, a position symmetrical with each LED 53 with respect to the first primary-colors light separating plate 52L-1. It should be noted that FIG. 27 is a sectional view taken along the line AA' in FIG. 26.

The LEDs 53 included in the first LED array A2-1 are disposed 0.5 w apart from the first primary-colors light separating plate 52L-1. Also, the first and second primary-colors light separating plates 52L-1 and 52L-2 are disposed with a pitch of $\underline{w}$. Therefore, a position C41 which is the middle between the first and second primary-colors light separating plates 52L-1 and 52L-2 and opposite to each LED 53 included in the first LED array A2-1 about the first primary-colors light separating plate 52L-1 will be apparent sources of the red, green and blue light having been reflected by the first primary-colors light separating plate 52L-1.

Also, the second primary-colors light separating plate 52L-2 transmits 50% of the light emitted from each of the LEDs 53 included in the second LED array A2-2 while reflecting 50% of the light.

As shown in FIG. 27, extended in a direction opposite to the traveling direction of the light having been reflected by the second primary-colors light separating plate 52L-2, the light path of the light will intersect with a position opposite to each LED 5 with reference to the second primary-colors light separating plate 52L-2 and 3, in other words, a position symmetrical with each LED 53 with respect to the second primary-colors light separating plate 52L-2.

The LEDs 53 included in the second LED array A2-2 are disposed 0.5 w apart from the second primary-colors light separating plate 52L-2. Also, the first and second primary-colors light separating plates 52L-1 and 52L-2 are disposed with a pitch of $\underline{w}$. Therefore, the position C41 which is the middle between the first and second primary-colors light separating plates 52L-1 and 52L-2 and opposite to each LED 53 included in the second LED array A2-2 about the second primary-colors light separating plate 52L-2 will be apparent sources of the red, green and blue light having been reflected by the second primary-colors light separating plate 52L-2.

Also, the array of LEDs 53 included in the first LED array A2-1 is the same as that of LEDs 53 included in the second LED array A2-2. Therefore, at the center C41 between the first and second primary-colors light separating plates 52L-1 and 52L-2, there is formed a virtual image 53' of the LED 53 as the apparent source of the light having been reflected by the first primary-color light separating plate 52L-1 as well as that of the light having been reflected by the second primary-colors light separating plate 52L-2. In other words, the virtual images 53' of the LEDs 53 disposed as in the LED array A2 is formed on a center line L3 between the first and second primary-colors light separating plates 52L-1 and 52L-2.

As having been explained above, the light source 150 forms, in an area between the two primary-colors light separating plates 52L, the virtual images 53' of the LEDs 53 included in the LED array A2 including the green, blue and red LEDs 53G, 53B and 53R.

That is, since the backlight device 20 including the aforementioned light source 150 forms the virtual images 53' of the LEDs 53 included in the LED arrays A2 disposed on the substrate 141, it is possible to increase the apparent number of the LEDs 53 disposed on the substrate 141.

Also, the light source 150 forms such virtual images 53' that a plurality of LED arrays A2 in which an array of the green, red, blue and green LEDs 53G, 53R, 53B and 53G is repeated appears to be disposed. Therefore, the backlight device 20 including the light source 150 can efficiently mix the red light, blue light and green light whose light intensity is nearly double those of the red light and blue light to produce white light that contributes to an improved sharpness of an image displayed on the liquid crystal panel 10.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A lighting device comprising:
   light emitting diodes (LED); and
   light separating means for reflecting a part of light emitted from the light emitting diodes while transmitting a part of the light,
   the light separating means transmitting a part of the light emitted from the light emitting diode while reflecting a part of the light to form, in a position symmetrical with the light emitting diode with respect to the light separating means, a virtual image of the light emitting diode which is an apparent source of the light having been reflected by the light separating means.

2. The lighting device according to claim 1, wherein the light separating means has a transmittance and reflectance corresponding to the intensity of light emitted from the light emitting diode that emits light for incidence upon the light separating means.

3. The lighting device according to claim 1, wherein the light emitting diodes include red light emitting diodes to emit red light, green light emitting diodes to emit green light and blue light emitting diodes to emit blue light.

4. The lighting device according to claim 3, where the light separating means includes red light separating means for transmitting a part of the red light while reflecting a part of the light and transmitting the green and blue light, green light separating means for transmitting a part of the green light while reflecting a part of the light and transmitting the blue and red light, and blue light separating means for transmitting a part of the blue light while reflecting a part of the light and transmitting the red and green light.

5. The lighting device according to claim 3, wherein the light separating means is a primary-colors light separating means for transmitting a part of the red, green and blue while reflecting a part of the light.

6. A lighting device comprising:
   a plurality of light emitting diodes (LED) each having a high directivity in a direction skewed from the optical axis thereof; and
   a plurality of light separating means for reflecting a part of light emitted from the light emitting diode while transmitting a part of the light,
   the light separating means being disposed with a predetermined pitch in array, and the light emitting diodes are disposed one in every other area between the light separating means; and
   the light separating means transmitting a part of the light emitted from the light emitting diode while reflecting a part of the light to form, in an area between the light separating means and where no light emitting diode is provided, a virtual image of the light emitting diode which is an apparent source of the light having been reflected by the light separating means.

7. The lighting device according to claim 6, wherein the light separating means has a transmittance and reflectance corresponding to the intensity of light emitted from the light emitting diode that emits light for incidence upon the light separating means.

8. The lighting device according to claim 6, wherein the light emitting diodes include red light emitting diodes to emit red light, green light emitting diodes to emit green light and blue light emitting diodes to emit blue light.

9. The lighting device according to claim 8, where the light separating means includes a red light separating means for transmitting a part of the red light while reflecting a part of the light and transmitting the green and blue light, a green light separating means for transmitting a part of the green light while reflecting a part of the light and transmitting the blue and red light, and a blue light separating means for transmitting a part of the blue light while reflecting a part of the light and transmitting the red and green light.

10. The lighting device according to claim 8, wherein the light separating means is a primary-colors light separating means for transmitting a part of the red, green and blue while reflecting a part of the light.

11. A liquid crystal display device including a transmission-type liquid crystal panel and a lighting device to light the liquid crystal panel from one main side of the latter, the lighting device comprising:
   light emitting diodes (LED); and
   light separating means for reflecting a part of light emitted from the light emitting diodes while transmitting a part of the light,
   the light separating means transmitting a part of the light emitted from the light emitting diode while reflecting a part of the light to form, in a position symmetrical with the light emitting diode with respect to the light separating means, a virtual image of the light emitting diode which is an apparent source of the light having been reflected by the light separating means.

12. The lighting device according to claim 11, wherein the light separating means has a transmittance and reflectance corresponding to the intensity of light emitted from the light emitting diode that emits light for incidence upon the light separating means.

13. The lighting device according to claim 11, wherein the light emitting diodes include red light emitting diodes to emit red light, green light emitting diodes to emit green light and blue light emitting diodes to emit blue light.

14. The lighting device according to claim 13, wherein the light separating means includes red light separating means for transmitting a part of the red light while reflecting a part of the light and transmitting the green and blue light; green light separating means for transmitting a part of the green light while reflecting a part of the light and transmitting the blue and red light; and blue light separating means for transmitting a part of the blue light while reflecting a part of the light and transmitting the red and green light.

15. The lighting device according to claim 13, wherein the light separating means is a primary-colors light separating means for transmitting a part of the red, green and blue while reflecting a part of the light.

* * * * *